(12) United States Patent
Brandelero et al.

(10) Patent No.: US 12,480,823 B2
(45) Date of Patent: Nov. 25, 2025

(54) METHOD AND SYSTEM FOR DETERMINING JUNCTION TEMPERATURE OF POWER SEMICONDUCTOR

(71) Applicant: MITSUBISHI ELECTRIC CORPORATION, Tokyo (JP)

(72) Inventors: Julio Brandelero, Rennes (FR); Guillaume Lefevre, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 325 days.

(21) Appl. No.: 18/276,800

(22) PCT Filed: Sep. 14, 2021

(86) PCT No.: PCT/JP2021/034921
§ 371 (c)(1),
(2) Date: Aug. 10, 2023

(87) PCT Pub. No.: WO2022/190436
PCT Pub. Date: Sep. 15, 2022

(65) Prior Publication Data
US 2024/0125655 A1    Apr. 18, 2024

(30) Foreign Application Priority Data
Mar. 9, 2021  (EP) .................................. 21305283

(51) Int. Cl.
*G01K 7/01* (2006.01)
*G01K 7/24* (2006.01)

(52) U.S. Cl.
CPC ................. *G01K 7/01* (2013.01); *G01K 7/24* (2013.01)

(58) Field of Classification Search
CPC ........ G01K 7/01; G01K 7/24; G01K 2215/00; G01K 7/16; G01K 2217/00
See application file for complete search history.

(56) References Cited

U.S. PATENT DOCUMENTS 4,352,053 A * 9/1982 Oguchi .................. H03L 1/023
330/289
5,351,010 A   9/1994 Leopold et al.
(Continued)

FOREIGN PATENT DOCUMENTS

| CN | 108462146 A | * | 8/2018 | ......... H03K 17/0822 |
| DE | 69531329 T2 | * | 4/2004 | ............. G01N 25/18 |

OTHER PUBLICATIONS

International Search Report (PCT/ISA/210) issued in PCT/JP2021/034921, dated Dec. 10, 2021.
(Continued)

*Primary Examiner* — Laura Martin
*Assistant Examiner* — Julia Fitzpatrick
(74) *Attorney, Agent, or Firm* — Birch, Stewart, Kolasch & Birch, LLP

(57) ABSTRACT

The present invention concerns a method for determining the junction temperature of a power semiconductor using a temperature sensitive electrical parameter of a thermal sensitive electrical device in a system comprising the thermal sensitive electrical device, an external electrical circuit, a compensation module and a measurement module. The compensation module is composed at least of a first and a second switches. The invention: —puts the first switch in a closing state and puts the second switch in an opening state during a first period of time in order to measure a first set of voltages, —changes the state of the first switch and/or the state of the second switch or the state of at least one another switch during at least one another period of time in order to measure at least one another voltage, —determines a value of the temperature sensitive parameter using the measured voltages.

8 Claims, 18 Drawing Sheets

(56) References Cited

U.S. PATENT DOCUMENTS

| | | | |
|---|---|---|---|
| 10,236,788 B2* | 3/2019 | Wohlgethan | H02M 7/06 |
| 2003/0025488 A1* | 2/2003 | Mazzochette | H03L 7/0995 |
| | | | 324/95 |
| 2007/0019488 A1* | 1/2007 | Heilmann | G11C 11/406 |
| | | | 365/211 |
| 2016/0018474 A1* | 1/2016 | Kikuchi | H01M 10/443 |
| | | | 324/431 |
| 2016/0131538 A1 | 5/2016 | Kobayashi | |

OTHER PUBLICATIONS

Written Opinion of the International Searching Authority (PCT/ISA/237) issued in PCT/JP2021/034921, dated Dec. 10, 2021.

* cited by examiner

METHOD AND SYSTEM FOR DETERMINING JUNCTION TEMPERATURE OF POWER SEMICONDUCTOR

TECHNICAL FIELD

The present invention relates generally to a method and a device for determining a junction temperature of a power semiconductor.

BACKGROUND ART

The junction temperature of a power semiconductor is a critical parameter to be measured during the operation of the power converter to increase the robustness against overheating and monitor the state of health of a power module.

Both, implanted on-chip sensors and thermally sensitive electrical parameters, can be used to estimate the junction temperature of a power semiconductor. The classical solutions have a small sensitivity in regards to the temperature requiring precise excitations, voltage/current sources and should be acquired precisely in time given their dynamic characteristics. Some of the Temperature Sensitive Electrical Parameters (TSEP) based methods also need external sensors for compensating the TSEP dependency on the load conditions. Finally, the malfunctioning of the one part of the sensor can indicate a wrong value of junction temperature to the user.

Many Temperature Sensitive Electrical Parameters based methods and in-chip sensors for on-line junction temperature estimation on power semiconductor impose requirements that are not compatible with the deployment on product applications like for example technologies that require high frequency sampling, or high resolution current measurement.

Some TSEP parameters cannot be measured independently during the power semiconductor operation. Given the variation of some TSEP with the load conditions, a complex calibration phase is necessary.

SUMMARY OF INVENTION

The present invention aims to provide a method and a device for determining the function temperature of a power semiconductor that does not need high time resolution or high resolution current and voltage measurement and no accurate signal source for determining the function temperature of the power semiconductor.

To that end, the present invention concerns a method for determining the junction temperature of a power semiconductor using a temperature sensitive electrical parameter of a thermal sensitive electrical device in a system comprising the thermal sensitive electrical device, an external electrical circuit, a compensation module and a measurement module, characterized in that the compensation module is composed at least of a first and a second switches, a first terminal of the first switch ($S_1$) is connected to a first terminal of the thermal sensitive electrical device, a second terminal of the first switch ($S_1$) is connected to a first terminal of the second switch ($S_3$), to a first terminal of the signal source (120) and to a first output of the compensation module (130), a second terminal of the second switch ($S_3$) is connected to a second terminal of the signal source and to a second output of the compensation module (130), wherein the method comprises the steps of:

putting the first switch in a closing state and putting the second switch in an opening state during a first period of time in order to measure a first set of voltages ($V_{TSEP}(t1)$, $V_{TSEP}(t2)$), changing the state of the first switch and/or the state of the second switch or the state of at least one another switch during at least one another period of time in order to measure at least one another voltage, and determining a value of the temperature sensitive parameter using the measured voltages.

The present invention concerns also a system for determining the junction temperature of a power semiconductor using a temperature sensitive electrical parameter of a thermal sensitive electrical device in a system comprising the thermal sensitive electrical device, an external electrical circuit, a compensation module and a measurement module, characterized in that the compensation module is composed at least of a first and a second switches, a first terminal of the first switch ($S_1$) is connected to a first terminal of the thermal sensitive electrical device, a second terminal of the first switch ($S_1$) is connected to a first terminal of the second switch ($S_3$), to a first terminal of the signal source (120) and to a first output of the compensation module (130), a second terminal of the second switch ($S_3$) is connected to a second terminal of the signal source and to a second output of the compensation module (130), wherein the system comprises:

means for putting the first switch in a closing state and putting the second switch in an opening state during a first period of time in order to measure a first set of voltages ($V_{TSEP}(t1)$, $V_{TSEP}(t2)$), means for changing the state of the first switch and/or the state of the second switch or the state of at least one another switch during at least one another period of time in order to measure at least one another voltage, and means for determining a value of the temperature sensitive parameter using the measured voltages.

Thus, the accuracy of the signal source and the stability with time and temperature of the signal source and/or the external electrical circuit or/and the compensation module or/and the measurement module doesn't have any impact on the accuracy of the inferred thermal sensitive parameter as the drifts with temperature or aging can be compensated. The implementation complexity of the signal source, the external electrical circuit and the measurement module are reduced as they don't need to be maintained stable and accurate all along the lifetime of the power semiconductor. Furthermore, the variation of the temperature sensitive parameter related to the operating point or aging of the power semiconductor may be compensated. Additionally, the compensation is made few moments before the temperature sensitive parameter determination with the last drifted circuitry parameter without any additional measurement module or additional signal source.

According to a particular feature, the state of the second switch is changed during the at least one another period of time named second period of time in order to measure the at least one another voltage, and the at least one another voltage is a voltage ($V_o$) that is representative of an offset voltage generated by parasitic resistors of the compensation module (130) and by an internal offset of the measurement module (140).

Thus, the offset drift of the compensation module and the measurement module with temperature and aging are made without any additional temperature sensors and without any additional measurement module. Furthermore, the compensation is made few moments before the temperature sensitive parameter determination. Additionally, any offset compensation circuit or any offset knowledge is necessary for an accurate estimation of the temperature sensitive parameter.

According to a particular feature, the state of the first and the second switches are changed during the at least one another period of time named third period of time and the at least another switch is a third switch ($S_2$) the state of which is set to closing state, the at least another voltage is a second set of voltages ($V_{C1}(t1)$, $V_{C1}(t2)$) that are representative of the signal source and the external electrical circuit (110) and a first terminal of the third switch ($S_2$) is connected to the second terminal of the first switch, a second terminal of the third switch ($S_2$) is connected to a first terminal of a first capacitor ($C_1$) and a second terminal of the first capacitor ($C_1$) is connected to a second terminal of the temperature sensitive electrical device and to a second terminal of the external electrical circuit.

Thus, the electrical variation and drift influence of the external electrical circuit (110) on the temperature sensitive parameter, that couldn't be disconnected from the thermal sensitive electrical device during the power semiconductor operation, can be removed and compensated few moments before the temperature sensitive parameter determination and without any additional measurement module. Furthermore, any external electrical circuit needs to be maintained stable for the correct temperature sensitive parameter estimation. The switch $S_2$ may have a series capacitor C1, then only the AC voltage of the external electrical circuit is considered.

According to a particular feature, the state of the first switch is changed during the at least one another period of time named fourth period of time and the at least another switch is a fourth switch ($S_5$) the state of which is set to closing state, the at least another voltage is a set of voltages ($V_{C2}(t1)$, $V_{C2}(t2)$) that are representative of the functioning of the second switch and a first terminal of the fourth switch ($S_5$) is connected to the second terminal of the first switch, a second terminal of the fourth switch ($S_5$) is connected to a first terminal of a second capacitor ($C_2$) and a second terminal of the first capacitor ($C_2$) is connected to the first terminal of the second switch ($S_3$).

Thus, the sampling time of the measurement module, t1, and t2 may be deduced and its variation with temperature and aging may be measured without any additional measurement chain. The variations and drifts are compensated to the lasted value for determining the temperature sensitive parameter.

According to a particular feature, the at least another switch is a fifth switch ($S_4$) the state of which is set to closing state during the at least one another period of time named fifth period of time, the at least another voltage is a voltage ($V_{R1}$) that is representative of the signal source and a first terminal of the fifth switch ($S_4$) is connected to the second terminal of the second switch, a second terminal of the fifth switch ($S_4$) is connected to a first terminal of a resistor ($R_1$) and a second terminal of the resistor ($R_1$) is connected to the first terminal of the second switch ($S_3$).

Thus the measurement chain measures a voltage, $V_{R1}$, that is proportional to the signal source level, in case of a current signal source $I_1$ such as: $I_1=V_{R1}/R_1$, in case of a voltage signal $V_1$ source such as: $V_1=V_{R1}$. The accuracy of the signal source doesn't have any impact on the accuracy of the inferred temperature sensitive parameter. The drift of the signal source with temperature or aging can be compensated. The implementation complexity of the signal source is reduced, as the signal source doesn't need to be maintained stable all along the lifetime of the device. Furthermore, the compensation is made few moments before the temperature sensitive parameter determination with the last drift and variation of the signal source without any additional measurement chain.

According to a particular feature, the temperature sensitive electrical parameter is an internal gate resistance in series with an input capacitance of a power semiconductor device.

Thus, the temperature sensitive parameter is only related to the internal gate resistance calculated using at least the latest value of the offset voltage or the signal source value, or the sampling time or the external electric variation. Furthermore, by using the sampling time value, the inferred temperature sensitive parameter does not depend on the other parameters like for example the parasitic input capacitance of the power semiconductor that changes with the operating point of the power semiconductor device such as the main voltage and current of the power semiconductor device and with the power semiconductor device aging.

According to a particular feature, the external circuit is a voltage source in series with a resistor or a short circuit or a resistor or a capacitor or an inductor or a switch.

Thus, the thermal sensitive electrical device can be polarised in order to control the power semiconductor states without interfering the temperature sensitive parameter determination. Advantageous, the temperature sensitive parameter may be determined during the normal operation of the power semiconductor without the influence of the load conditions of the power semiconductor. Furthermore, the circuit variation out of the specified range can be detected and informed to a user.

According to a particular feature, the signal source is a current source.

Thus, the response of the temperature sensitive parameter is translated to a voltage signal that is measured with a classical voltage measurement present on the measurement module.

According to a particular feature, the temperature sensitive electrical device is a PN junction implanted on a power semiconductor device or implanted close to the power semiconductor device.

Thus, the accuracy of the current sources does not influence on the temperature sensitive parameter estimation. As the PN junction can be modelled by a voltage source that depends only on the junction temperature in series with a resistor which the related voltage depends on the temperature and on the current source signal level, the compensation enables to remove the resistive part of the PN junction model and be independent on the current signal level. Furthermore, the measurement module offset can be compensated.

According to a particular feature, the temperature sensitive electrical device is a resistance dependent on the temperature implanted on the power semiconductor device or implanted close to a power semiconductor.

Thus, the variation of the measured voltage with the current level can be compensate, the current signal source does not need to be precise and the measurement module offset can be compensated.

According to a particular feature, the at least one other voltage is compared to a reference voltage and a notification is generated if the at least one other voltage is out of the range of the reference voltage.

Thus, a drift and/or a possible malfunctioning present on the thermal sensitive electrical device and/or the external electrical circuit and/or the signal source and/or the compensation module and/or the measurement module are identified and can trigger a maintenance operation.

The characteristics of the invention will emerge more clearly from a reading of the following description of example embodiments, the said description being produced with reference to the accompanying drawings.

BRIEF DESCRIPTION OF DRAWINGS

FIG. 5l represents an example of an algorithm for determining the junction temperature of a power semiconductor from a temperature sensitive parameter according to the first embodiment and when the compensation module comprises the switches $S_1$, $S_2$, $S_3$, $S_4$ and $S_5$ and the capacitors $C_1$, $C_2$ and the resistor $R_1$.

DESCRIPTION OF EMBODIMENTS

Figure 1:
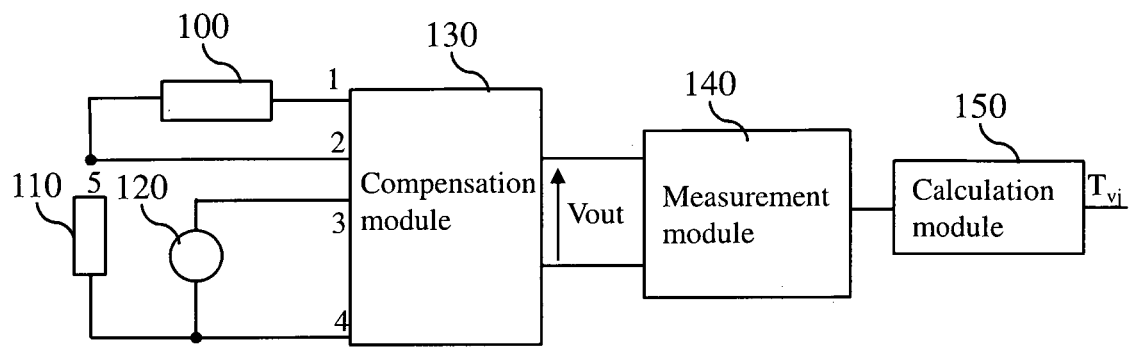
FIG. 1 represents a device for determining the junction temperature of a power semiconductor from a temperature sensitive parameter according to the invention.

FIG. 1 represents a device for determining the junction temperature of a power semiconductor from a temperature sensitive parameter according to the invention.

The device for determining the junction temperature of a power semiconductor from a temperature sensitive parameter comprises a thermal sensitive electrical device 100, a signal source 120, an external electrical circuit 110, a compensation module 130, a measurement module 140 and a calculation module 150.

The signal source 120 is a DC or AC current or voltage source, for example a 25 mA dc current source or a 2V peak to peak sinusoidal voltage source.

The external electrical circuit 110 is a voltage source in series with a resistor or a short circuit or a resistor or a capacitor or an inductor or a switch.

The thermal sensitive electrical device 100 is for example an internal gate resistance in series with an input capacitance of the power semiconductor device, or a PN junction or a thermistor, resistance dependent on the temperature, implanted on a power semiconductor device, or a PN junction or a thermistor, resistance dependent on the temperature, implanted close to a power semiconductor device. The thermal sensitive electrical device 100 will be disclosed in more detail in reference to FIGS. 4a to 4c.

The compensation module 130 is able to connect or disconnect the signal source 120 from the thermal sensitive electrical device 100 in order to enable the measurement module 140 to measure the characteristics of the signal source 120 by measuring a voltage, $V_i$, which is stored on the calculation module 150. The compensation module 130 is also able to connect the signal source to the external electrical circuit 110 in order to enable the measurement module 140 to measure the characteristics of the external electrical circuit 110 by measuring a voltage, $V_j$, which is stored on the calculation module 150. The compensation module 130 is also able to connect the signal source 120 to the measurement module 140 in order to measure the characteristics of the signal source 120 by measuring a voltage, $V_k$, which is stored on the calculation module 150.

The measurement module 140 measures the output voltage of the compensation module 130. For example, the measurement module 140 is composed by an analogue to digital converter ADC driven by a differential operational amplifier in combination or not with a sample and hold device.

The calculation module determines the temperature sensitive parameter value from the voltages outputted by the measurement module 140.

A first terminal of the external electrical circuit 110 is connected to a first terminal of the signal source 120 and to an input noted 4 of the compensation module 130. A second terminal of the external electrical circuit 110 is denoted 5. The second terminal of the external electric circuit 110 may be connected to a gate of a power semiconductor or to a base of a power semiconductor that is used as thermal sensitive electrical device 100 and to an input noted 2 of the compensation module 130.

A second terminal of the signal source 120 is connected to an input noted 3 of the compensation module 130.

A first terminal of the thermal sensitive electrical device 100 is connected to an input noted 2 of the compensation module 130 and a second terminal of the thermal sensitive electrical device 100 is connected to an input noted 1 of the compensation module 130.

Figure 2:
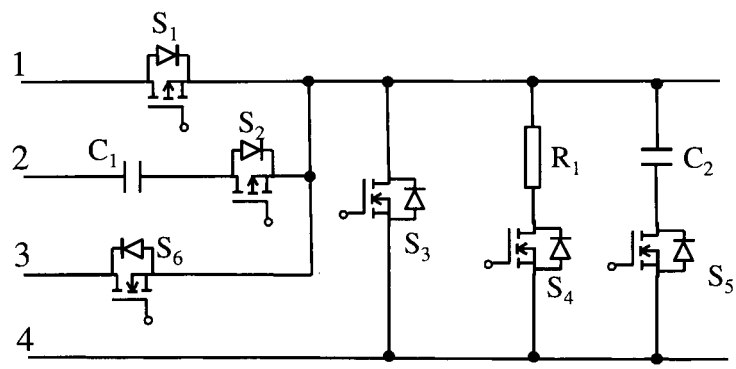
FIG. 2 represents a compensation module of the device for determining the junction temperature of a power semiconductor from a temperature sensitive parameter according to the invention.

FIG. 2 represents a compensation module of the device for determining the junction temperature of a power semiconductor from a temperature sensitive parameter according to the invention.

The compensation module 130 is composed of at most six switches $S_1$ to $S_6$.

The drain of the switch $S_1$ is connected to the input noted 1 of the compensation module 130. The source of the switch $S_1$ is connected to the source of the switch $S_2$, to the source of the switch $S_6$, to the drain of the switch $S_3$, to a first terminal of a resistor $R_1$ and to a first terminal of a capacitor $C_2$.

A first terminal of a capacitor $C_1$ is connected to the input noted 2 of the compensation module 130. A second terminal of the capacitor $C_1$ is connected to the drain of the switch $S_2$.

The drain of the switch $S_6$ is connected to the input noted 3 of the compensation module 130.

The input noted 4 of the compensation module 130 is connected to the source of the switch $S_3$, to the source of the switch $S_4$ and to the source of the switch $S_5$.

The voltage Vout at the output of the compensation module 130 is between the source of the switch S1 and the input noted 4 of the compensation module 130.

The switch $S_6$ is used only when the signal source 120 is a voltage source. When the signal source 120 is a current source, the switch $S_6$ remains closed or may be replaced by a short circuit.

When the thermal sensitive electrical device 100 is, according to the first embodiment, a power semiconductor, the compensation module 130 may comprise:
  only the switches $S_1$ and $S_3$ or
  only the switches $S_1$, $S_3$ and $S_4$ and the resistor $R_1$ or
  only the switches $S_2$, $S_3$ and $S_1$ and the capacitor $C_1$ or
  only the switches $S_1$, $S_3$ and $S_5$ and the capacitor $C_2$ or
  only the switches $S_3$, $S_4$ and $S_1$ and the resistor $R_1$ or
  only the switches $S_4$, $S_2$, $S_1$ and $S_3$, the resistor $R_1$ and the capacitor $C_1$ or
  only the switches $S_4$, $S_5$, $S_1$ and $S_3$, the resistor $R_1$ and the capacitor $C_2$ or
  only the switches $S_2$, $S_5$, $S_1$ and $S_3$, the capacitor $C_1$ and the capacitor $C_2$ or
  only the switches $S_3$, $S_4$, $S_2$ and $S_1$, the capacitor $C_1$ and the resistor $R_1$ or
  only the switches $S_2$, $S_3$, $S_4$, $S_5$ and $S_1$, the capacitor $C_1$, the capacitor $C_2$ and the resistor $R_1$.

When the thermal sensitive electrical device 100 is, according to the second embodiment, a PN junction, the compensation module 130 may comprise:
  only the switches $S_1$ and $S_3$ or
  only the switches $S_1$ and $S_4$ and the resistor $R_1$ or
  only the switches $S_3$, $S_4$ and $S_1$ and the resistor $R_1$.

When the thermal sensitive electrical device 100 is, according to the second embodiment, a resistor, the compensation module 130 may comprise:
  only the switches $S_1$ and $S_3$ or
  only the switches $S_1$ and $S_4$ and the resistor $R_1$ or
  only the switches $S_3$, $S_1$ and $S_4$ and the resistor $R_1$.

An example of capacitors $C_1$ and $C_2$ is the class 1 type regarding to standard IEC/EN 60384-1. The resistor $R_1$ is a stable resistor with a temperature coefficient around 20 ppm/° C. A classical reference is the resistor family PTN commercialized by the company Vishay.

When the circuit is not operating, the switch $S_1$, $S_3$ and $S_6$ are closed and the switches $S_2$, $S_4$ and $S_5$ are open.

Figure 3:
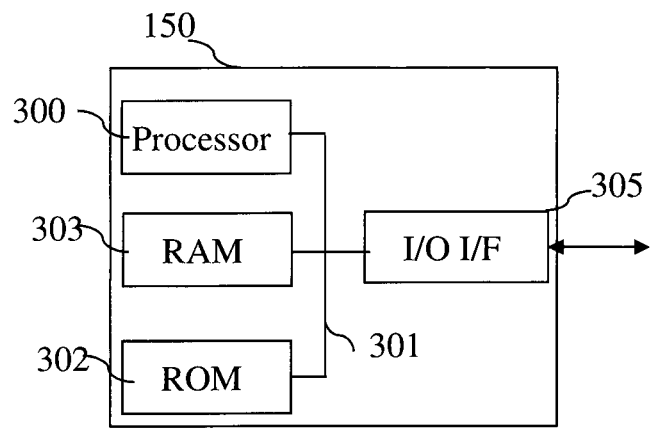
FIG. 3 represents an architecture of a calculation module of the device for determining the junction temperature of a power semiconductor from a temperature sensitive parameter according to the invention.

FIG. 3 represents an architecture of a calculation module of the device for determining the junction temperature of a power semiconductor from a temperature sensitive parameter according to the invention.

Figure 5A:
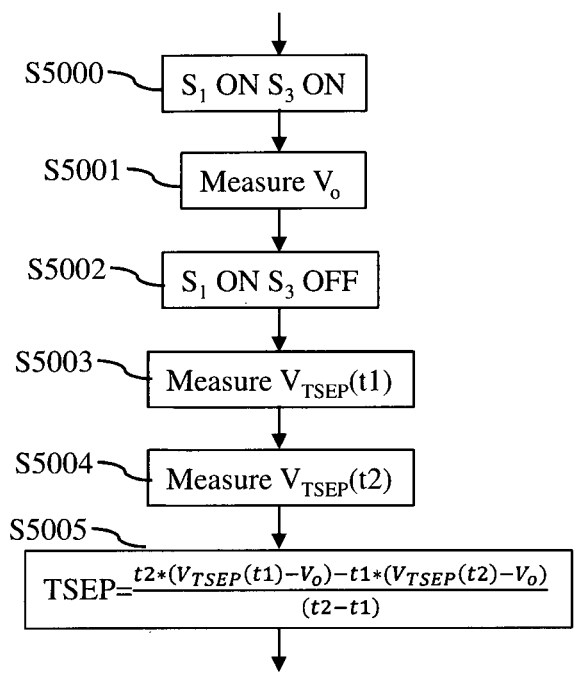
FIG. 5a represents an example of an algorithm for determining the junction temperature of a power semiconductor from a temperature sensitive parameter according to the first embodiment and when the compensation module comprises only the switches $S_1$ and $S_3$.
Figure 5B:
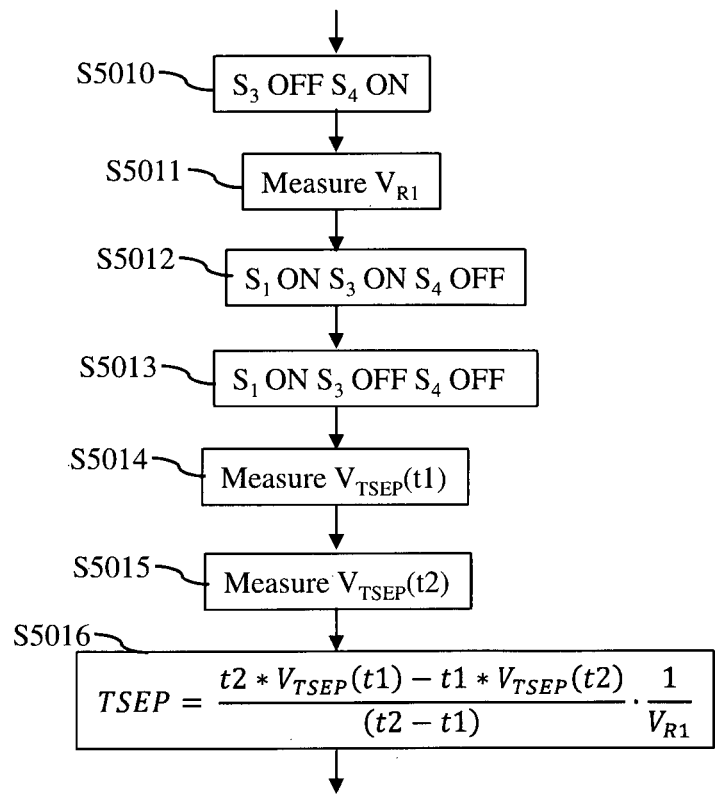
FIG. 5b represents an example of an algorithm for determining the junction temperature of a power semiconductor from a temperature sensitive parameter according to the first embodiment and when the compensation module comprises only the switches $S_1$, $S_3$ and $S_4$ and the resistor $R_1$.
Figure 5C:
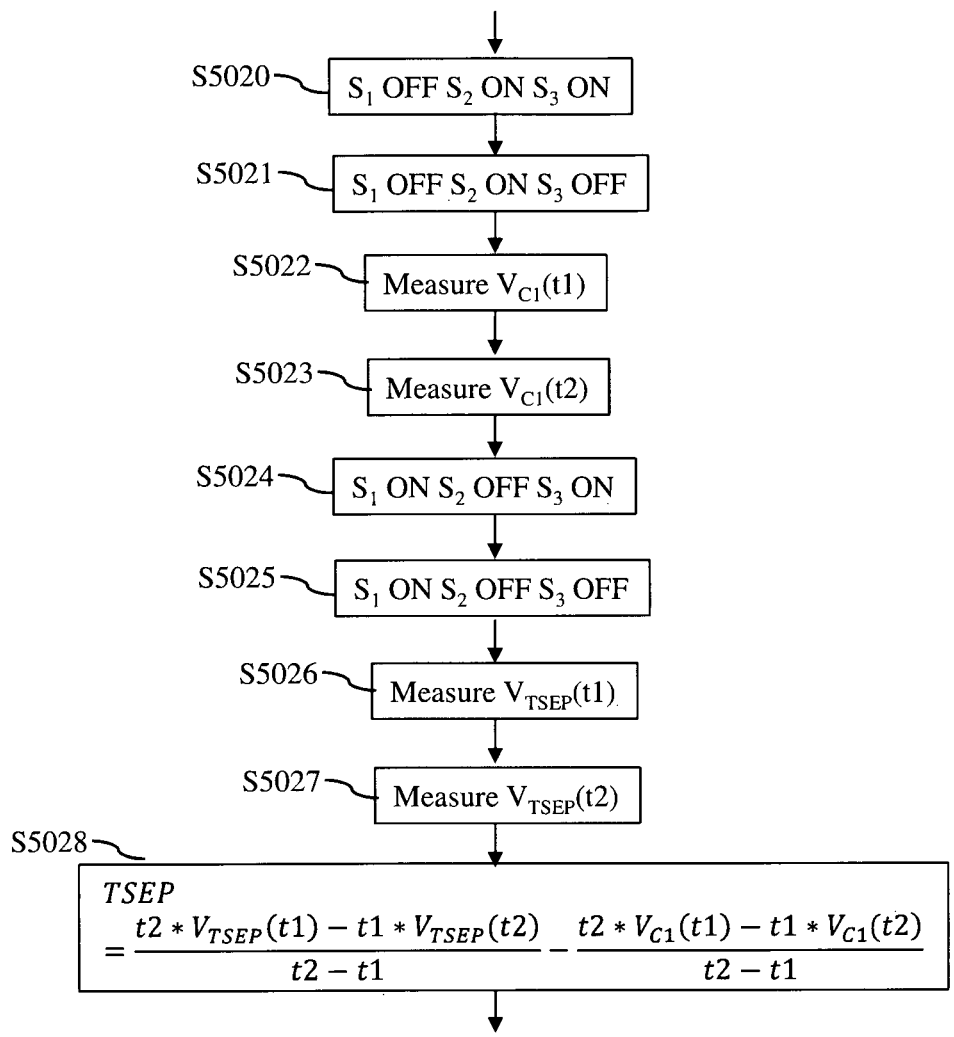
FIG. 5c represents an example of an algorithm for determining the junction temperature of a power semiconductor from a temperature sensitive parameter according to the first embodiment and when the compensation module comprises only the switches $S_2$, $S_3$ and $S_1$ and the capacitor $C_1$.
Figure 5D:
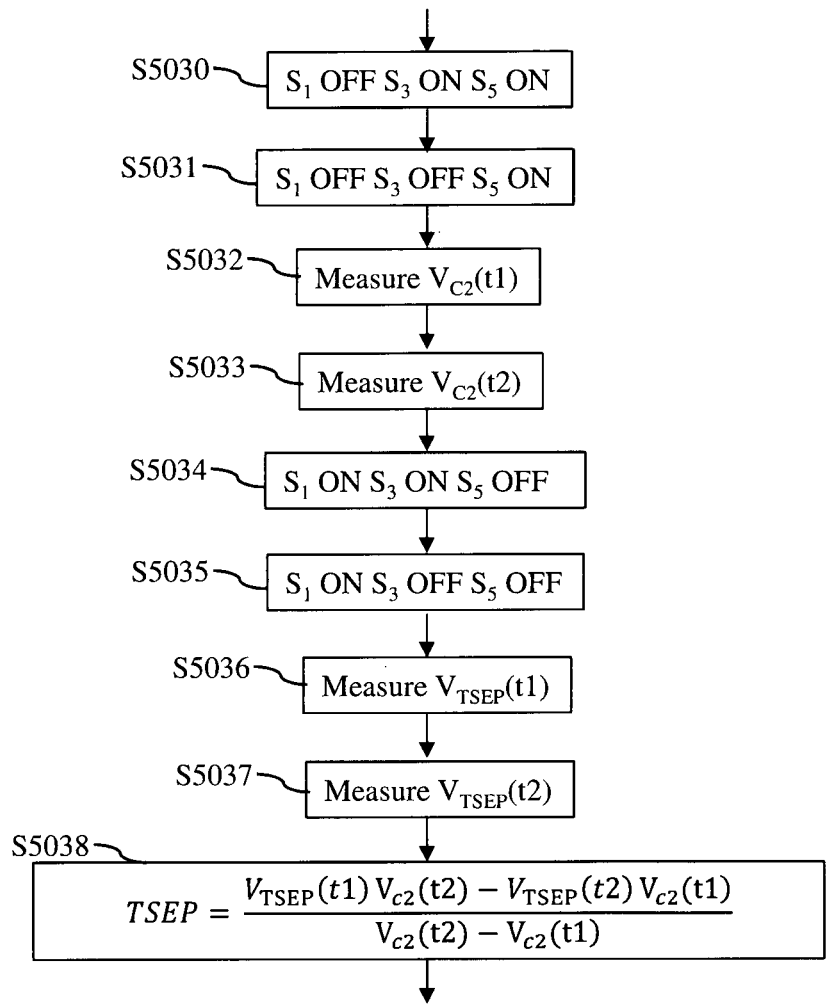
FIG. 5d represents an example of an algorithm for determining the junction temperature of a power semiconductor from a temperature sensitive parameter according to the first embodiment and when the compensation module comprises only the switches $S_1$, $S_3$ and $S_5$ and the capacitor $C_2$.
Figure 5E:
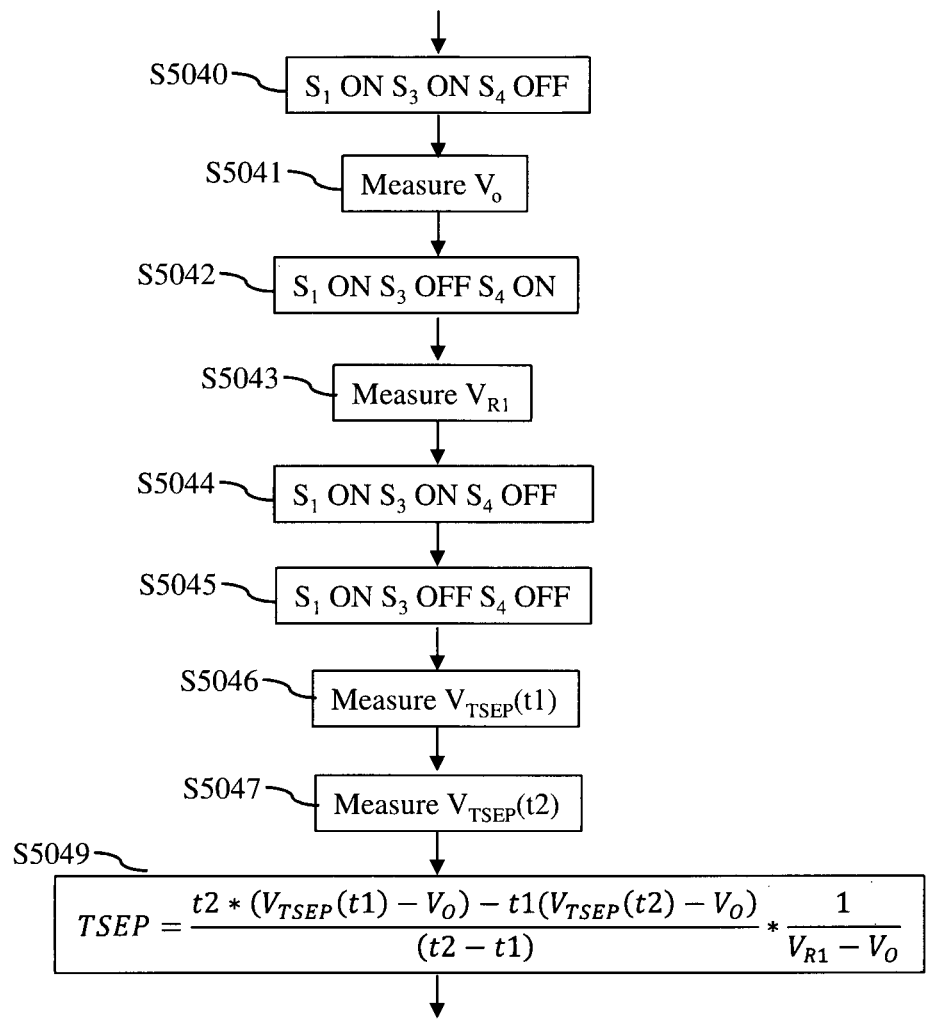
FIG. 5e represents an example of an algorithm for determining the junction temperature of a power semiconductor from a temperature sensitive parameter according to the first embodiment and when the compensation module comprises only the switches $S_3$, $S_4$ and $S_1$ and the resistor $R_1$.
Figure 5F:
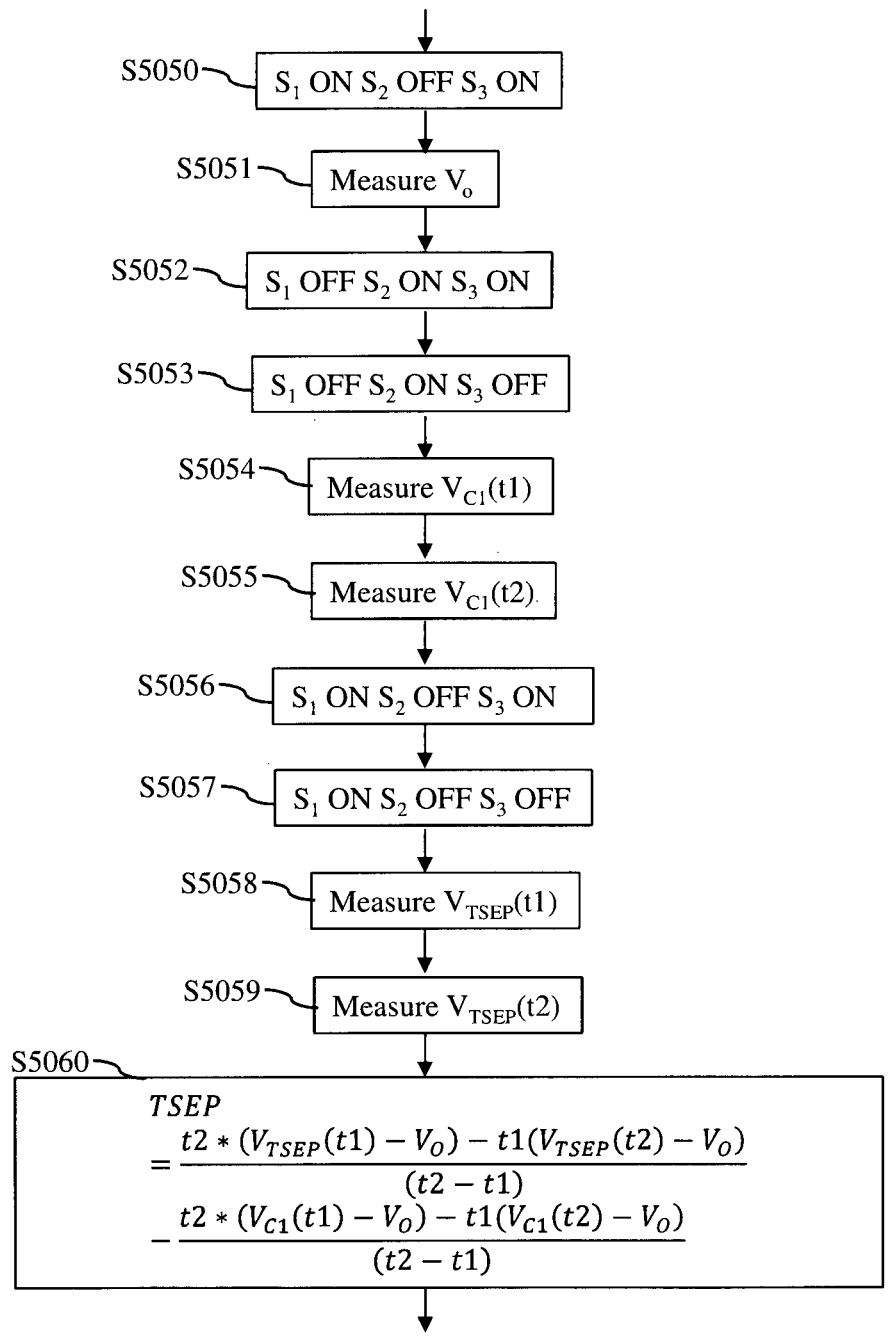
FIG. 5f represents an example of an algorithm for determining the junction temperature of a power semiconductor from a temperature sensitive parameter according to the first embodiment and when the compensation module comprises only the switches $S_1$, $S_2$ and $S_3$ and the capacitor $C_1$.
Figure 5G:
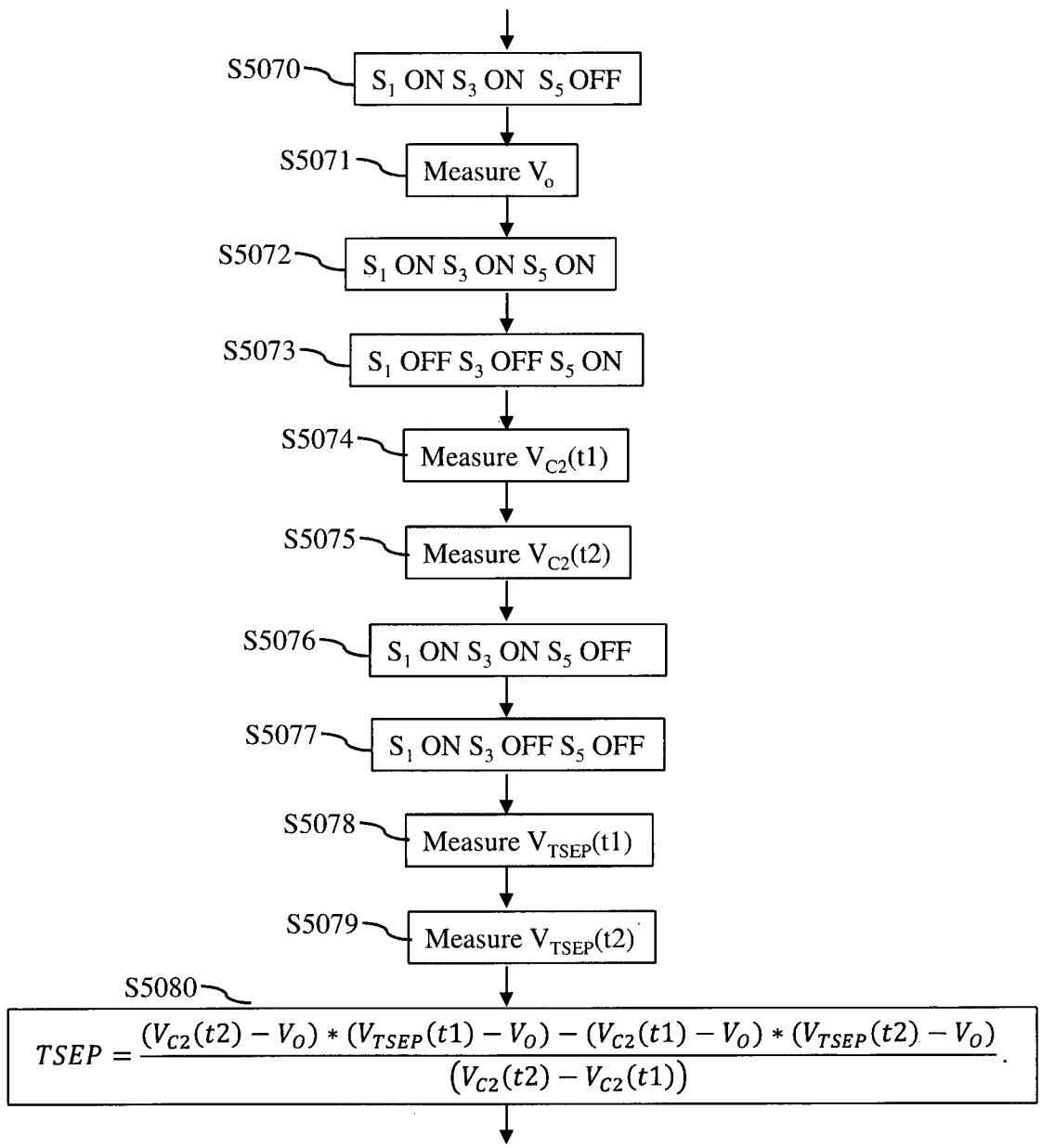
FIG. 5g represents an example of an algorithm for determining the junction temperature of a power semiconductor from a temperature sensitive parameter according to the first embodiment and when the compensation module comprises only the switches $S_1$, $S_3$ and $S_5$ and the capacitor $C_2$.
Figure 5H:
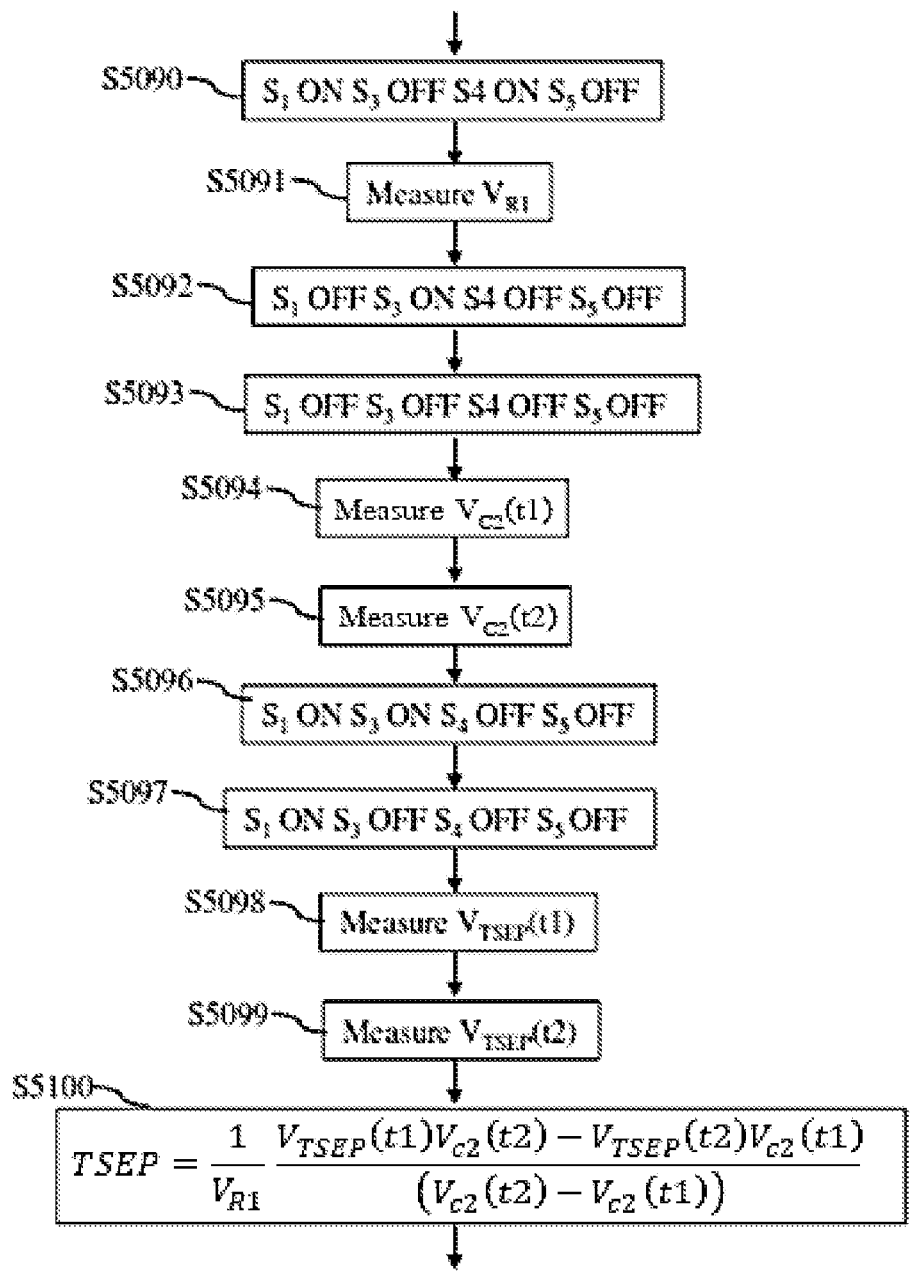
FIG. 5h represents an example of an algorithm for determining the junction temperature of a power semiconductor from a temperature sensitive parameter according to the first embodiment and when the compensation module comprises only the switches $S_1$, $S_3$, $S_4$ and $S_5$ and the capacitor $C_2$.
Figure 5I:
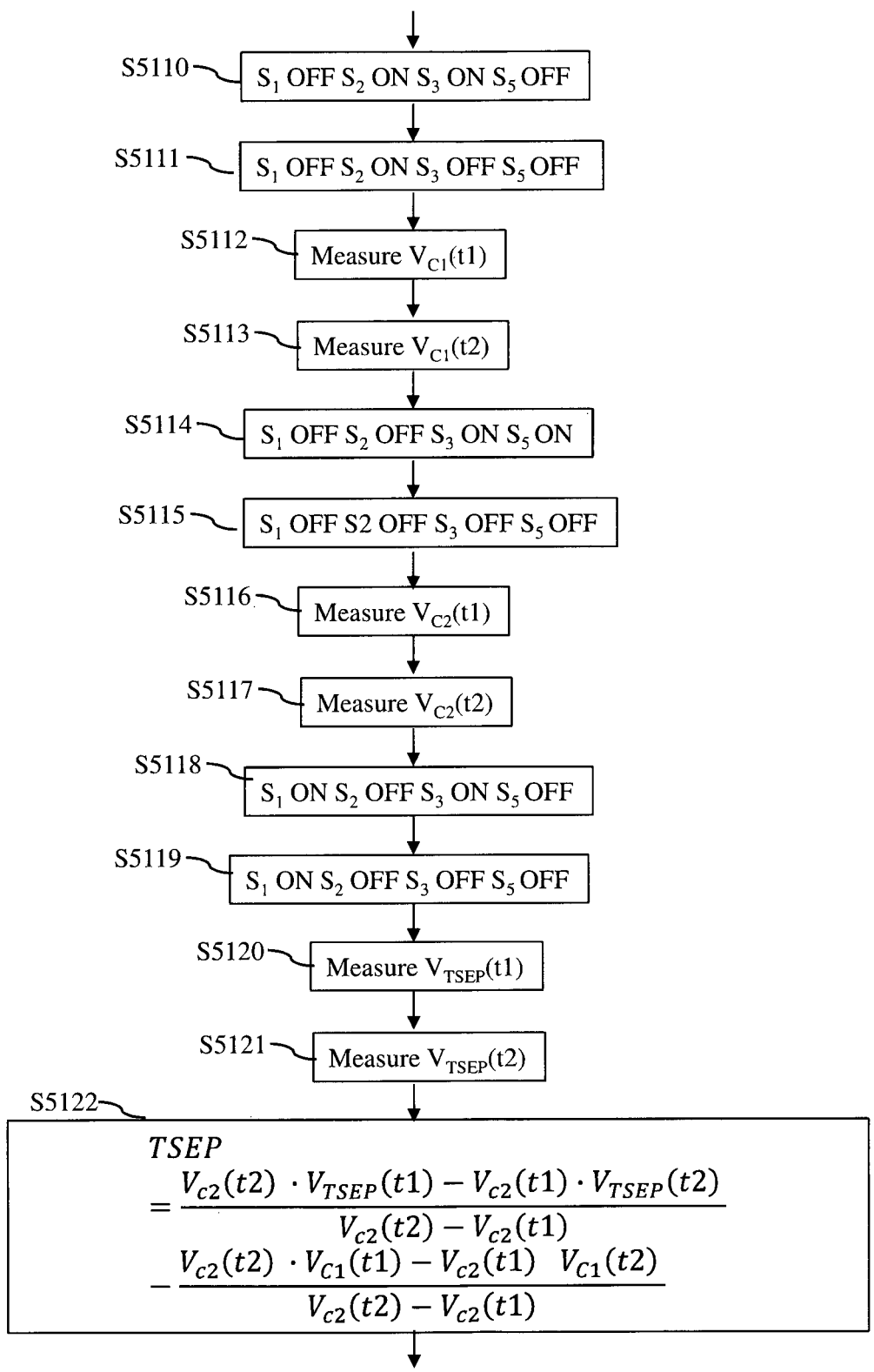
FIG. 5i represents an example of an algorithm for determining the junction temperature of a power semiconductor from a temperature sensitive parameter according to the first embodiment and when the compensation module comprises only the switches $S_1$, $S_2$, $S_3$ and $S_5$ and the capacitors $C_1$ and $C_2$.
Figure 5J:
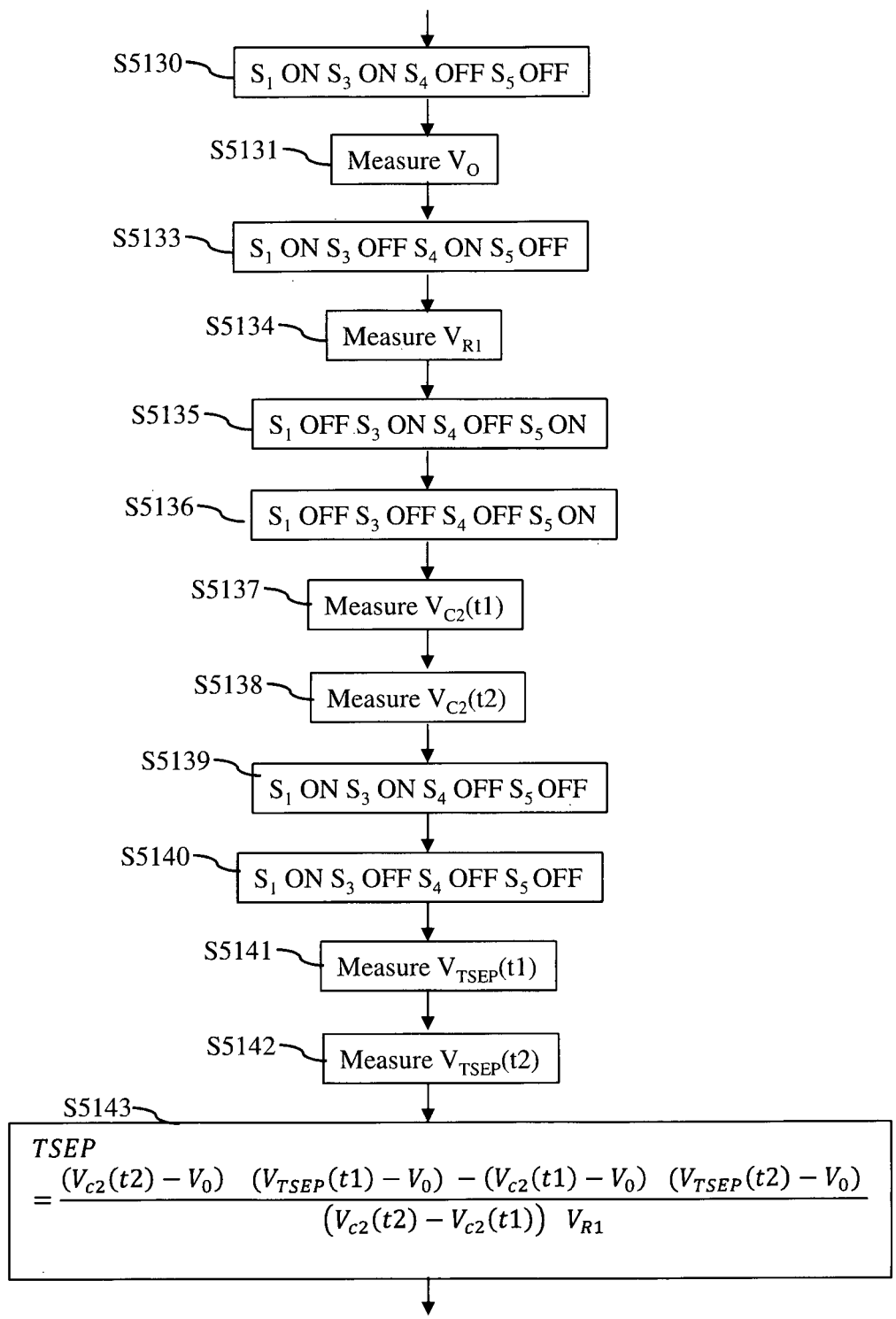
FIG. 5j represents an example of an algorithm for determining the junction temperature of a power semiconductor from a temperature sensitive parameter according to the first embodiment and when the compensation module comprises only the switches $S_1$, $S_3$, $S_4$ and $S_5$ and the capacitor $C_2$ and the resistor $R_1$.
Figure 5K:
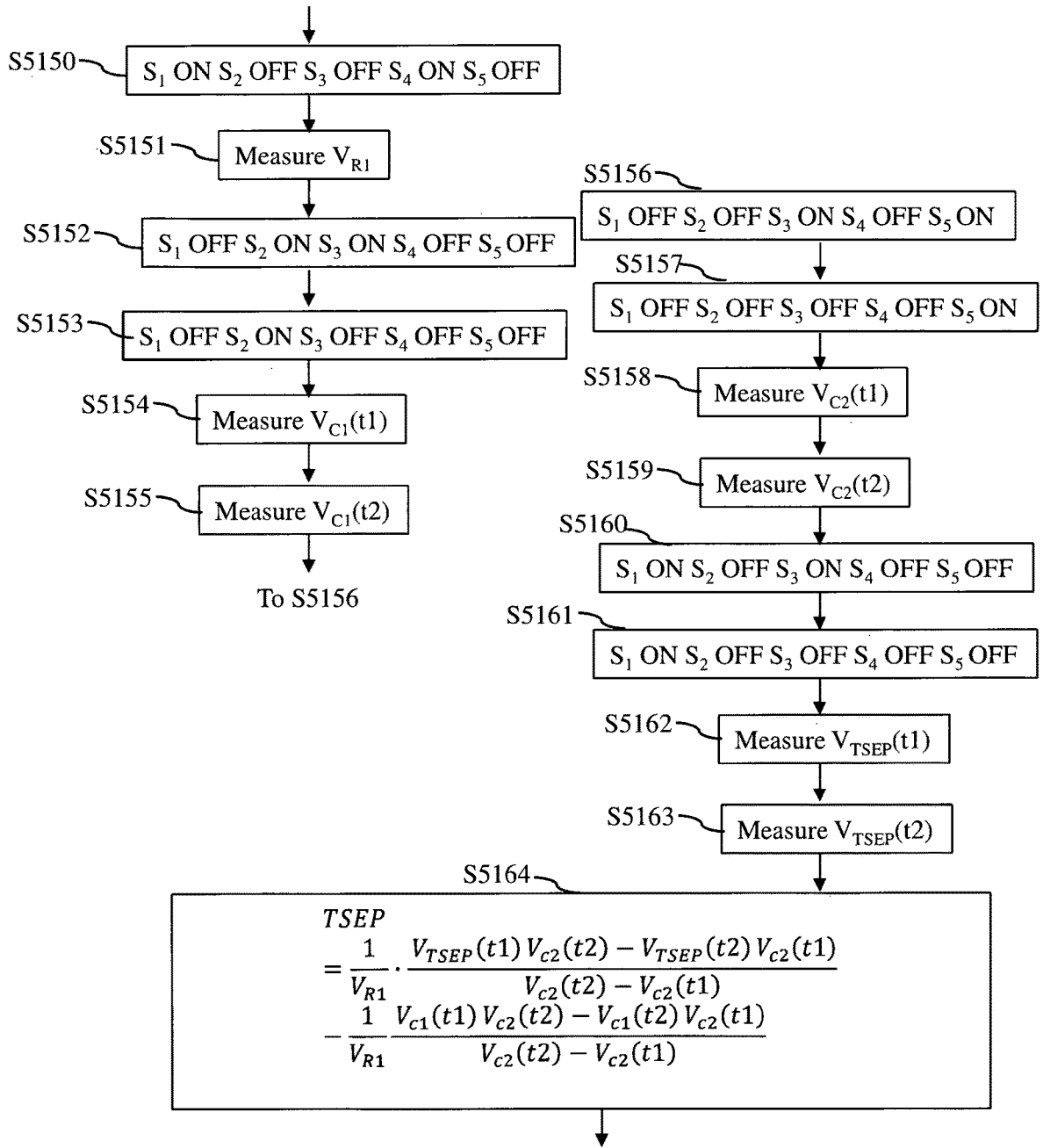
FIG. 5k represents an example of an algorithm for determining the junction temperature of a power semiconductor from a temperature sensitive parameter according to the first embodiment and when the compensation module comprises only the switches $S_1$, $S_2$, $S_3$, $S_4$ and $S_5$ and the capacitors $C_1$, $C_2$ and the resistor $R_1$.
Figure 51:
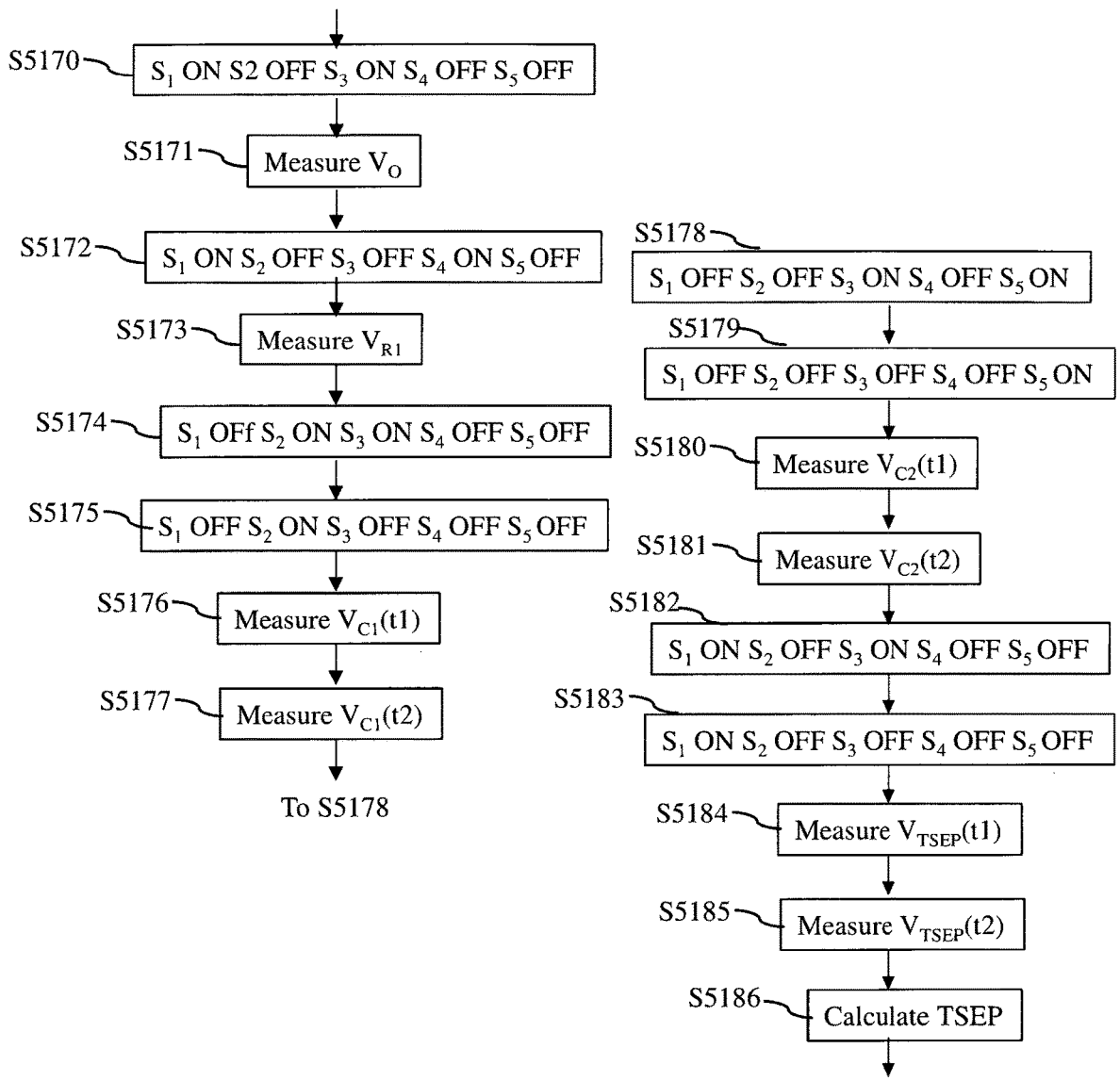
Figure 5M:
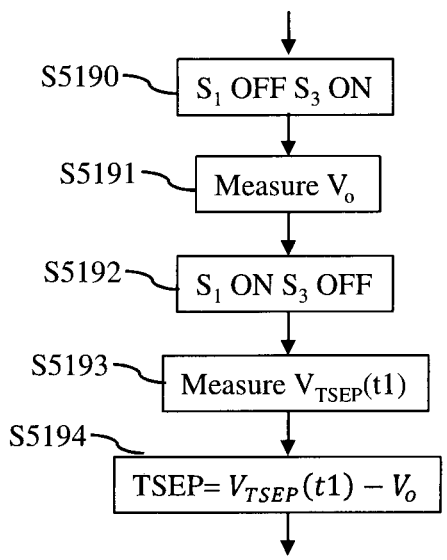
FIG. 5m represents an example of an algorithm for determining the junction temperature of a power semiconductor from a temperature sensitive parameter according to the second and third embodiments and when the compensation module comprises only the switches $S_1$ and $S_3$.
Figure 5N:
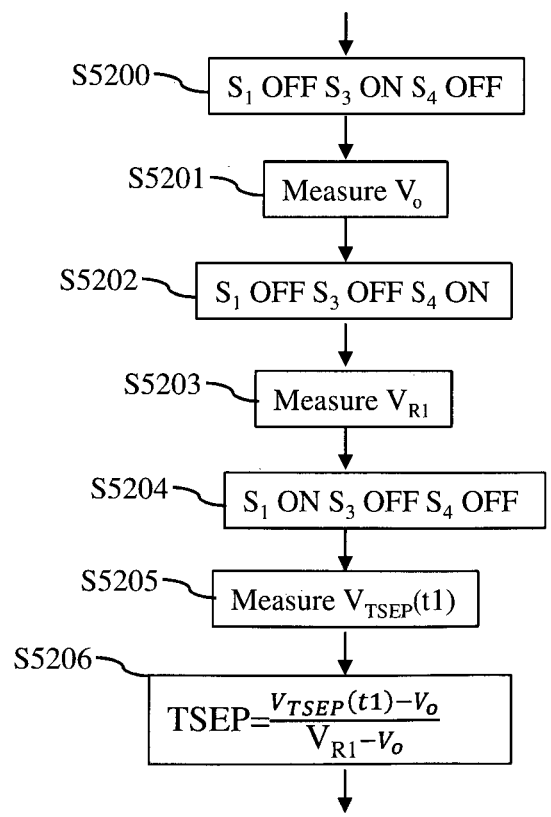
FIG. 5n represents an example of an algorithm for determining the junction temperature of a power semiconductor from a temperature sensitive parameter according to the second and third embodiments and when the compensation module comprises only the switches $S_1$, $S_3$ and $S_4$ and the resistor $R_1$.
Figure 5O:
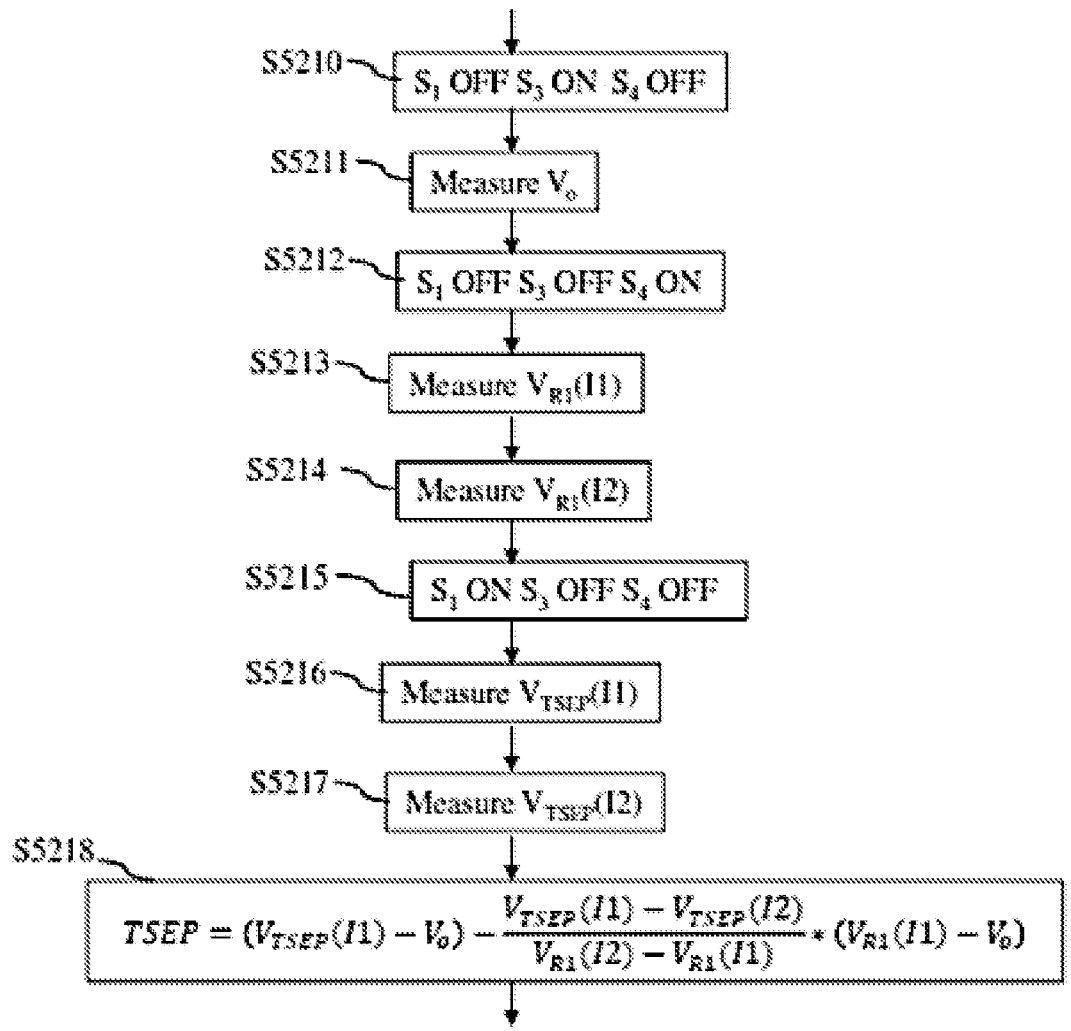
FIG. 5o represents an example of an algorithm for determining the junction temperature of a power semiconductor from a temperature sensitive parameter according to the second embodiment and when the compensation module comprises only the switches $S_1$, $S_3$ and $S_4$ and the resistor $R_1$.
Figure 5P:
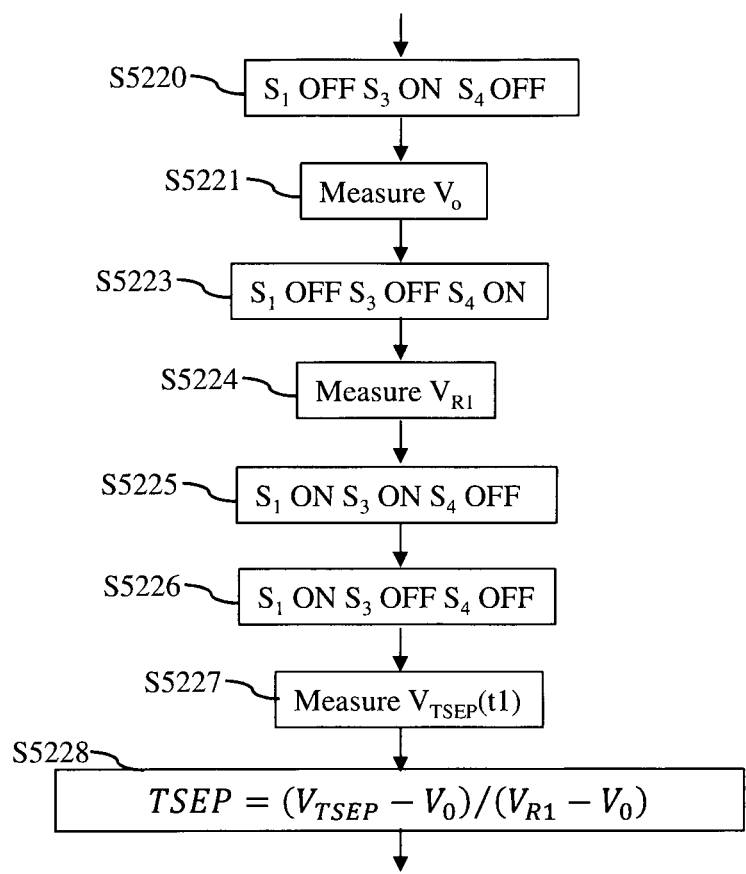
FIG. 5p represents an example of an algorithm for determining the junction temperature of a power semiconductor from a temperature sensitive parameter according to the second and third embodiments and when the compensation module comprises only the switches $S_1$, $S_3$ and $S_4$ and the resistor $R_1$.
Figure 5Q:
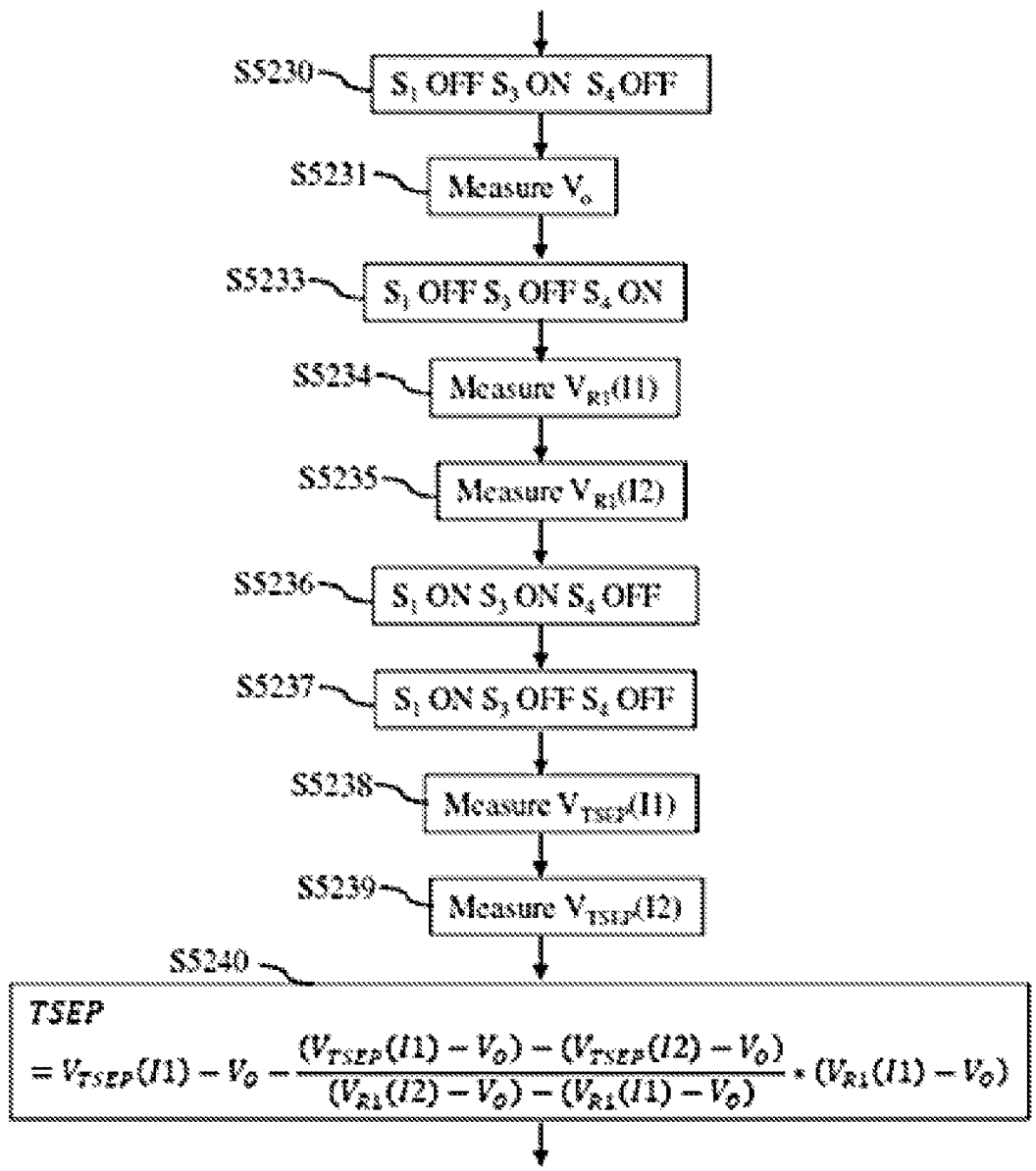
FIG. 5q represents an example of an algorithm for determining the junction temperature of a power semiconductor from a temperature sensitive parameter according to the second embodiment and when the compensation module comprises only the switches $S_1$, $S_3$ and $S_4$ and the resistor $R_1$.

The calculation module 150 has, for example, an architecture based on components connected together by a bus 301 and a processor 300 controlled by a program as disclosed in FIGS. 5a to 5q.

The bus 301 links the processor 300 to a read only memory ROM 302, a random access memory RAM 303 and an input output interface I/O IF 305.

The input output interface I/O IF 305 enables the calculation module to drive the switches $S_1$ and/or $S_2$ and/or $S_3$ and/or $S_4$ and/or $S_5$ and/or $S_6$ and to receive the signal Vm outputted by the measurement module 140.

The memory 303 contains registers intended to receive variables and the instructions of the program related to the algorithm as disclosed in FIGS. 5a to 5q.

The read-only memory, or possibly a Flash memory 302, contains instructions of the programs related to the algorithm as disclosed in FIGS. 5a to 5q, when the calculation module 150 is powered on, are loaded to the random access memory 303. Alternatively, the program may also be executed directly from the ROM memory 302.

The calculation performed by the calculation module 150 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In other words, the calculation module 150 includes circuitry, or a device including circuitry, causing the calculation module 150 to perform the program related to the algorithm as disclosed in FIGS. 5a to 5q.

Figure 4A:
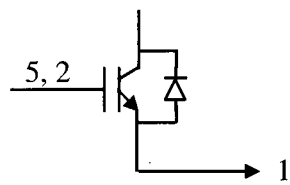
FIG. 4a represents a first embodiment of a temperature sensitive electric device used for determining the junction temperature of a power semiconductor according to the invention.

FIG. 4a represents a first embodiment of a temperature sensitive electric device used for determining the junction temperature of a power semiconductor according to the invention.

In the example of FIG. 4a, the thermal sensitive electrical device 100 is a power semiconductor device. The emitter of the power semiconductor device is connected to the input noted 1 of the compensation module 130 and the gate of the power semiconductor device is connected to the input noted 2 of the compensation module 130 and to the terminal 5 of the external electric circuit 110.

The thermal sensitive parameter is proportional to the internal gate resistance value that is in series with the input capacitance of the power semiconductor.

The power semiconductor device may be a MOS-type transistor, for example a MOSFET or an IGBT, the source or the emitter of the power semiconductor device is connected to the input noted 1 of the compensation module 130 and the gate of the power semiconductor device is connected to the input noted 2 of the compensation module 130 and to the terminal 5 of the external electric circuit 110.

Figure 4B:
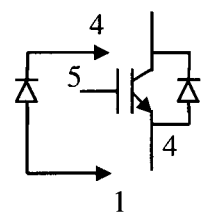
FIG. 4b represents a second embodiment of a temperature sensitive electric device used for determining the junction temperature of a power semiconductor according to the invention.

FIG. 4b represents a second embodiment of a temperature sensitive electric device used for determining the junction temperature of a power semiconductor according to the invention.

In the example of FIG. 4b, the thermal sensitive electrical device 100 is a PN junction implanted on a power semiconductor device or implanted close to the power semiconductor device. The thermal sensitive parameter is proportional to the voltage across the PN junction.

The cathode of the PN junction is connected to the input noted 4 of the compensation module 130, the gate of the power semiconductor device is connected to the terminal 5 of the external electric circuit 110 and the anode of the PN junction is connected to the input noted 1 of the compensation module 130. The source or the emitter of the power semiconductor device is connected to the input noted 4 of the compensation module 130.

In another embodiment, the gate of the power semiconductor device is also connected to the input noted 2 of the compensation module 130 and to the terminal 5 of the external electric circuit 110.

Figure 4C:
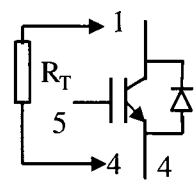
FIG. 4c represents a third embodiment of a temperature sensitive electric device used for determining the junction temperature of a power semiconductor according to the invention.

FIG. 4c represents a third embodiment of a temperature sensitive electric device used for determining the junction temperature of a power semiconductor according to the invention.

In the example of FIG. 4c, the thermal sensitive electrical device 100 is a resistance dependent on the temperature, implanted on the power semiconductor device or implanted close to a power semiconductor.

The thermal sensitive parameter is proportional to the resistance value.

A first terminal of the resistance is connected to the input noted 4 of the compensation module 130, the gate of the power semiconductor device is connected to the terminal 5 of the external electric circuit 110 and a second terminal of the resistance is connected to the input noted 1 of the compensation module 130.

The source or the emitter of the power semiconductor device is connected to the input noted 4 of the compensation module 130.

In another embodiment, the gate of the power semiconductor device is connected to the input noted 2 of the compensation module 130 and to the terminal 5 of the external electric circuit 110.

FIG. 5a represents an example of an algorithm for determining the junction temperature of a power semiconductor from a temperature sensitive parameter according to the first embodiment and when the compensation module comprises only the switches $S_1$ and $S_3$.

The present algorithm is disclosed in an example wherein it is executed by the processor 300.

At step S5000, the processor 300 transfers a signal for closing the switch $S_1$ and a signal for closing the switch $S_3$.

At step S5001, the processor 300 reads the signal $V_o$ outputted by the measurement module 140. The Signal $V_o$ is representative of an offset voltage generated by parasitic resistors of the compensation module 130 and by an internal offset of the measurement module 140.

For example, if $V_o$ is superior to 0.3 Volts, it means that the measurement module 140 has a drift and that a possible malfunctioning exists on the compensation module 130 and/or on the measurement module 140.

At step S5002, the processor 300 transfers a signal for closing the switch $S_1$ and a signal for opening the switch $S_3$.

Then, the signal source 120 provides a current with an amplitude I1 that flows through the thermal sensitive electrical device 100.

At step S5003, the processor 300, at an instant t1, reads the signal $V_{TSEP}(t1)$ outputted by the measurement module 140. The instant t1 is for example triggered 1 µs after the opening of the switch $S_3$.

At step S5004, the processor 300, at an instant t2, reads the signal $V_{TSEP}(t2)$ outputted by the measurement module 140. The instant t2 is for example triggered 2 µs after the opening of the switch $S_3$.

At step S5005, the processor 300 calculates the value of the temperature sensitive parameter as the following expression.

$$TSEP = \frac{t2 * (V_{TSEP}(t1) - V_o) - t1 * (V_{TSEP}(t2) - V_o)}{(t2 - t1)}$$

From the TSEP value, the processor 300 determines the temperature using a look up table determined during a calibration phase stored in the RAM memory 303.

FIG. 5*b* represents an example of an algorithm for determining the junction temperature of a power semiconductor from a temperature sensitive parameter according to the first embodiment and when the compensation module comprises only the switches $S_1$, $S_3$ and $S_4$ and the resistor $R_1$.

The present algorithm is disclosed in an example wherein it is executed by the processor 300.

At step S5010, the processor 300 transfers a signal for opening the switch $S_3$ and a signal for closing the switch $S_4$.

Then, the signal source 120 provides a current with an amplitude I1 that flows through the resistor $R_1$.

At step S5011, the processor 300 reads the signal $V_{R1}$ outputted by the measurement module 140 after a certain time, for example 1 μs. The Signal $V_{R1}$ is representative of the current of the signal source 120 and the resistor $R_1$ of the compensation module 130.

The signal $V_{R1}$ may be outputted for monitoring purposes. For example, the nominal value of $V_{R1}$ is determined by the resistor R1 value, e.g 100 Ω and by the current value of the signal source 120, e.g. 20 mA, giving $V_{R1}$=2V. In case $V_{R1}$ increases by more than 5% compared to the nominal value, for example 100 mV, the signal source 120 has drift and a possible malfunctioning is present on the signal source 120.

At step S5012, the processor 300 transfers a signal for closing the switch $S_1$, a signal for closing the switch $S_3$ and a signal for opening the switch $S_4$.

At step S5013, the processor 300 transfers a signal for closing the switch $S_1$, a signal for opening the switch $S_3$ and a signal for opening the switch $S_4$.

At step S5014, the processor 300, at an instant t1, reads the signal $V_{TSEP}$(t1) outputted by the measurement module 140. The instant t1 is for example triggered 1 μs after the opening of the switch $S_3$.

At step S5015, the processor 300, at an instant t2, reads the signal $V_{TSEP}$(t2) outputted by the measurement module 140. The instant t2 is for example triggered 2 μs after the opening of the switch $S_3$.

At step S5016, the processor 300 calculates the temperature sensitive parameter as the following expression.

$$TSEP = \frac{t2 * V_{TSEP}(t1) - t1 * V_{TSEP}(t2)}{(t2 - t1)} \cdot \frac{1}{V_{R1}}$$

From the TSEP value, the processor 300 determines the temperature using a look up table determined during a calibration phase stored in the RAM memory 303.

FIG. 5*c* represents an example of an algorithm for determining the junction temperature of a power semiconductor from a temperature sensitive parameter according to the first embodiment and when the compensation module comprises only switches $S_2$, $S_3$ and $S_1$ and the capacitor $C_1$.

The present algorithm is disclosed in an example wherein it is executed by the processor 300.

At step S5020, the processor 300 transfers a signal for opening the switch $S_1$, a signal for closing the switch $S_2$ and a signal for closing the switch $S_3$.

Then, the capacitor $C_1$ is charged at the voltage of the external circuit 110.

At step S5021, the processor 300 transfers a signal for opening the switch $S_1$, a signal for closing the switch $S_2$ and a signal for opening the switch $S_3$.

At step S5022, the processor 300, at an instant t1, reads the signal $V_{C1}$(t1) outputted by the measurement module 140. The instant t1 is for example triggered 1 μs after the opening of the switch $S_3$.

Then, the signal source 120 provides a current with an amplitude I1 that flows through the capacitor $C_1$ and to the external electrical circuit 110.

At step S5023, the processor 300, at an instant t2, reads the signal $V_{C1}$(t2) outputted by the measurement module 140. The instant t2 is for example triggered 2 μs after the opening of the switch $S_3$.

The signal $V_{C1}$(t1), $V_{C1}$(t2) may be used for monitoring purposes. For example, the nominal value of $$\frac{t2 * V_{C1}(t1) - t1 * V_{C1}(t2)}{t2 - t1}$$

is memorized or calculated.

For example, for a signal source 120 of 20 mA and the external electrical circuit 110 composed of a voltage source in series with a resistor of 5 Ω

$$\frac{t2 * V_{C1}(t1) - t1 * V_{C1}(t2)}{t2 - t1} = 100 \text{ mV}.$$

In case $$\frac{t2 * V_{C1}(t1) - t1 * V_{C1}(t2)}{t2 - t1}$$

increases by more than 100% compared to the nominal value, for example 200 mV, the external electrical circuit 110 has drift and a possible malfunctioning is present on the circuit 110.

At step S5024, the processor 300 transfers a signal for closing the switch $S_1$, a signal for opening the switch $S_2$ and a signal for closing the switch $S_3$. At step S5025, the processor 300 transfers a signal for closing the switch $S_1$, a signal for opening the switch $S_2$ and a signal for opening the switch $S_3$.

Then, the signal source 120 provides a current with an amplitude I1 that flows through the thermal sensitive electrical device 100.

At step S5026, the processor 300, at an instant t1, reads the signal $V_{TSEP}$(t1) outputted by the measurement module 140. The instant t1 is for example triggered 1 μs after the opening of the switch $S_3$.

At step S5027, the processor 300, at an instant t2, reads the signal $V_{TSEP}$(t2) outputted by the measurement module 140. The instant t2 is for example triggered 2 μs after the opening of the switch $S_3$.

At step S5028, the processor 300 calculates the voltage of the temperature sensitive parameter as the following expression.

$$TSEP = \frac{t2 * V_{TSEP}(t1) - t1 * V_{TSEP}(t2)}{t2 - t1} - \frac{t2 * V_{C1}(t1) - t1 * V_{C1}(t2)}{t2 - t1}$$

From the TSEP value, the processor 300 determines the temperature using a look up table determined during a calibration phase stored in the RAM memory 303.

FIG. 5d represents an example of an algorithm for determining the junction temperature of a power semiconductor from a temperature sensitive parameter according to the first embodiment and when the compensation module comprises only the switches $S_1$, $S_3$ and $S_5$ and the capacitor $C_2$.

The present algorithm is disclosed in an example wherein it is executed by the processor 300.

At step S5030, the processor 300 transfers a signal for opening the switch $S_1$, a signal for closing the switch $S_3$ and a signal for closing the switch $S_5$.

At step S5031, the processor 300 transfers a signal for opening the switch $S_1$, a signal for opening the switch $S_3$ and a signal for closing the switch $S_5$.

At step S5032, the processor 300, at an instant t1, reads the signal $V_{C2}(t1)$ outputted by the measurement module 140. The instant t1 is for example triggered 1 µs after the opening of the switch $S_3$.

At step S5033, the processor 300, at an instant t2, reads the signal $V_{C2}(t2)$ outputted by the measurement module 140. The instant t2 is for example triggered 2 µs after the opening of the switch $S_3$.

The signals $V_{C2}(t1)$, $V_{C2}(t2)$ may be outputted for monitoring purposes. For example, the nominal value of $V_{C2}(t1)$ is memorized or calculated. For example, for a capacitor $C_2$ value of 10 nF, a current source 120 of 20 mA and t1=1 µs, $V_{C2}(t1)$=2V. In case $V_{C2}(t1)$ increases or reduces by more than 10% compared to the nominal value, for example 1.8V or 2.2V, a malfunctioning is present on the switch $S_3$.

At step S5034, the processor 300 transfers a signal for closing the switch $S_1$, a signal for closing the switch $S_3$ and a signal for opening the switch $S_5$.

At step S5035, the processor 300 transfers a signal for closing the switch $S_1$, a signal for opening the switch $S_3$ and a signal for opening the switch $S_3$.

At step S5036, the processor 300, at an instant t1, reads the signal $V_{TSEP}(t1)$ outputted by the measurement module 140. The instant t1 is for example triggered 1 µs after the opening of the switch $S_3$.

At step S5037, the processor 300, at an instant t2, reads the signal $V_{TSEP}(t2)$ outputted by the measurement module 140. The instant t2 is for example triggered 2 µs after the opening of the switch $S_3$.

At step S5038, the processor 300 calculates the voltage of the temperature sensitive parameter as the following expression.

$$TSEP = \frac{V_{TSEP}(t1) * V_{C2}(t2) - V_{TSEP}(t2) * V_{C2}(t1)}{V_{C2}(t2) - V_{C2}(t1)}$$

From the TSEP value, the processor 300 determines the temperature using a look up table determined during a calibration phase stored in the RAM memory 303.

FIG. 5e represents an example of an algorithm for determining the junction temperature of a power semiconductor from a temperature sensitive parameter according to the first embodiment and when the compensation module comprises only the switches $S_3$, $S_4$ and $S_1$ and the resistor $R_1$.

The present algorithm is disclosed in an example wherein it is executed by the processor 300.

At step S5040, the processor 300 transfers a signal for closing the switch $S_1$, a signal for closing the switch $S_3$ and a signal for opening the switch $S_4$.

At step S5041, the processor 300 reads the signal $V_o$ outputted by the measurement module 140. The Signal $V_o$ is representative of an offset voltage generated by parasitic resistors of the compensation module 130 and by an internal offset of the measurement module 140.

For example, if $V_o$ is superior to 0.3 Volts, it means that the measurement module 140 has a drift and that a possible malfunctioning exists on the compensation module 130 and/or on the measurement module 140.

At step S5042, the processor 300 transfers a signal for closing the switch $S_1$, a signal for opening the switch $S_3$ and a signal for closing the switch $S_4$.

Then, the signal source 120 provides a current with an amplitude I1 that flows through the resistor $R_1$. In the steady state, the current I1 flows entirely through $R_1$.

At step S50443, the processor 300 reads the signal $V_{R1}$ outputted by the measurement module 140. The Signal $V_{R1}$ is representative of the current of the signal source 120 and the resistor $R_1$ of the compensation module 130.

The signal $V_{R1}$ may be outputted for monitoring purposes. For example, the nominal value of $V_{R1}$ is determined by the resistor R1 value, e.g 100 Ω and by the current value of the signal source 120, e.g. 20 mA, giving $V_{R1}$=2V. In case $V_{R1}$ increases by more than 5% compared to the nominal value, for example 100 mV, the signal source 120 has drift and a possible malfunctioning is present on the signal source 120.

At step S5044, the processor 300 transfers a signal for closing the switch $S_1$, a signal for closing the switch $S_3$ and a signal for opening the switch $S_4$.

At step S5045, the processor 300 transfers a signal for closing the switch $S_1$, a signal for opening the switch $S_3$ and a signal for opening the switch $S_4$.

At step S5076, the processor 300, at an instant t1, reads the signal $V_{TSEP}(t1)$ outputted by the measurement module 140. The instant t1 is for example triggered 1 µs after the opening of the switch $S_3$.

At step S5047, the processor 300, at an instant t2, reads the signal $V_{TSEP}(t2)$ outputted by the measurement module 140. The instant t2 is for example triggered 2 µs after the opening of the switch $S_3$.

At step S5049, the processor 300 calculates the voltage of the temperature sensitive parameter as the following expression.

$$TSEP = \frac{t2*(V_{TSEP}(t1) - V_O) - t1(V_{TSEP}(t2) - V_O)}{(t2 - t1)} * \frac{1}{V_{R1} - V_O}$$

From the TSEP value, the processor 300 determines the temperature using a look up table determined during a calibration phase stored in the RAM memory 303.

FIG. 5f represents an example of an algorithm for determining the junction temperature of a power semiconductor from a temperature sensitive parameter according to the first embodiment and when the compensation module comprises only the switches $S_1$, $S_2$ and $S_3$ and the capacitor $C_1$.

The present algorithm is disclosed in an example wherein it is executed by the processor 300.

At step S5050, the processor 300 transfers a signal for closing the switch $S_1$, a signal for opening the switch $S_2$ and a signal for closing the switch $S_3$.

At step S5051, the processor 300 reads the signal $V_o$ outputted by the measurement module 140. The Signal $V_o$ is representative of an offset voltage generated by parasitic resistors of the compensation module 130 and by an internal offset of the measurement module 140.

For example, if $V_o$ is superior to 0.3 Volts, it means that the measurement module 140 has a drift and that a possible malfunctioning exists on the compensation module 130 and/or on the measurement module 140.

At step S5052, the processor 300 transfers a signal for opening the switch $S_1$, a signal for closing the switch $S_2$ and a signal for closing the switch $S_3$.

At step S5053, the processor 300 transfers a signal for opening the switch $S_1$, a signal for closing the switch $S_2$ and a signal for opening the switch $S_3$.

At step S5054, the processor 300, at an instant t1, reads the signal $V_{C1}(t1)$ outputted by the measurement module 140. The instant t1 is for example triggered 1 µs after the opening of the switch $S_3$.

At step S5055, the processor 300, at an instant t2, reads the signal $V_{C1}(t2)$ outputted by the measurement module 140. The instant t2 is for example triggered 2 µs after the opening of the switch $S_3$.

The signal $V_{C1}(t1)$, $V_{C1}(t2)$ may be used for monitoring purposes. For example, the nominal value of $$\frac{t2*V_{C1}(t1) - t1*V_{C1}(t2)}{t2 - t1}$$

is memorized or calculated. For example, for a signal source 120 of 20 mA and the external electrical circuit 110 composed of a voltage source in series with a resistor of 5 Ω

$$\frac{t2*V_{C1}(t1) - t1*V_{C1}(t2)}{t2 - t1} = 100 \text{ mV}.$$

In case $$\frac{t2*V_{C1}(t1) - t1*V_{C1}(t2)}{t2 - t1}$$

increases by more than 100% compared to the nominal value, for example 200 mV, the external electrical circuit 110 has a drift and a possible malfunctioning is present on the circuit 110.

At step S5056, the processor 300 transfers a signal for closing the switch $S_1$, a signal for opening the switch $S_2$ and a signal for closing the switch $S_3$.

At step S5057, the processor 300 transfers a signal for closing the switch $S_1$, a signal for opening the switch $S_2$ and a signal for opening the switch $S_3$.

At step S5058, the processor 300, at an instant t1, reads the signal $V_{TSEP}(t1)$ outputted by the measurement module 140. The instant t1 is for example triggered 1 µs after the opening of the switch $S_3$.

At step S5059, the processor 300, at an instant t2, reads the signal $V_{TSEP}(t2)$ outputted by the measurement module 140. The instant t2 is for example triggered 2 µs after the opening of the switch $S_3$.

At step S5060, the processor 300 calculates the parameter of the temperature sensitive parameter as the following expression.

$$TSEP = \frac{t2*(V_{TSEP}(t1) - V_o) - t1(V_{TSEP}(t2) - V_o)}{(t2 - t1)} - \frac{t2*(V_{C1}(t1) - V_o) - t1(V_{C1}(t2) - V_o)}{(t2 - t1)}$$

From the TSEP value, the processor 300 determines the temperature using a look up table determined during a calibration phase stored in the RAM memory 303.

FIG. 5g represents an example of an algorithm for determining the junction temperature of a power semiconductor from a temperature sensitive parameter according to the first embodiment and when the compensation module comprises only the switches $S_1$, $S_3$ and $S_5$ and the capacitor $C_2$.

The present algorithm is disclosed in an example wherein it is executed by the processor 300.

At step S5070, the processor 300 transfers a signal for closing the switch $S_1$, a signal for closing the switch $S_3$ and a signal for opening the switch $S_5$.

At step S5071, the processor 300 reads the signal $V_o$ outputted by the measurement module 140. The Signal $V_o$ is representative of an offset voltage generated by parasitic resistors of the compensation module 130 and by an internal offset of the measurement module 140.

For example, if $V_o$ is superior to 0.3 Volts, it means that the measurement module 140 has a drift and that a possible malfunctioning exists on the compensation module 130 and/or on the measurement module 140.

At step S5072, the processor 300 transfers a signal for closing the switch $S_1$, a signal for closing the switch $S_3$ and a signal for closing the switch $S_5$.

At step S5073, the processor 300 transfers a signal for opening the switch $S_1$, a signal for opening the switch $S_3$ and a signal for closing the switch $S_5$.

At step S5074, the processor 300, at an instant t1, reads the signal $V_{C2}(t1)$ outputted by the measurement module 140. The instant t1 is for example triggered 1 µs after the opening of the switch $S_3$.

At step S5075, the processor 300, at an instant t2, reads the signal $V_{C2}(t2)$ outputted by the measurement module 140. The instant t2 is for example triggered 2 µs after the opening of the switch $S_3$.

The signals $V_{C2}(t1)$, $V_{C2}(t2)$ may be outputted for monitoring purposes. For example, the nominal value of $V_{C2}(t1)$ is memorized or calculated. For example, for a capacitor $C_2$ value of 10 nF, a current source 120 of 20 mA and t1=1 µs, $V_{C2}(t1)=2V$. In case $V_{C2}(t1)$ increases or reduces by more than 10% compared to the nominal value, for example 1.8V or 2.2V, a malfunctioning is present on the switch $S_3$.

At step S5076, the processor 300 transfers a signal for closing the switch $S_1$, a signal for closing the switch $S_3$ and a signal for opening the switch $S_5$.

At step S5077, the processor 300 transfers a signal for closing the switch $S_1$, a signal for opening the switch $S_3$ and a signal for opening the switch $S_5$.

At step S5078, the processor 300, at an instant t1, reads the signal $V_{TSEP}(t1)$ outputted by the measurement module 140. The instant t1 is for example triggered 1 µs after the opening of the switch $S_3$.

At step S5079, the processor 300, at an instant t2, reads the signal $V_{TSEP}(t2)$ outputted by the measurement module 140. The instant t2 is for example triggered 2 µs after the opening of the switch $S_3$.

At step S5080, the processor 300 calculates the voltage of the temperature sensitive parameter as the following expression.

$$TSEP = \frac{(V_{C2}(t2) - V_o)*(V_{TSEP}(t1) - V_o) - (V_{C2}(t1) - V_o)*(V_{TSEP}(t2) - V_o)}{(V_{C2}(t2) - V_{C2}(t1))}$$

From the TSEP value, the processor 300 determines the temperature using a look up table determined during a calibration phase stored in the RAM memory 303.

FIG. 5h represents an example of an algorithm for determining the junction temperature of a power semiconductor from a temperature sensitive parameter according to the first embodiment and when the compensation module comprises only the switches $S_1$, $S_3$, $S_4$ and $S_5$ and the capacitor $C_2$.

The present algorithm is disclosed in an example wherein it is executed by the processor 300.

At step S5090, the processor 300 transfers a signal for closing the switch $S_1$, a signal for closing the switch $S_3$, a signal for closing the switch $S_4$ and a signal for opening the switch $S_5$.

At step S5091, the processor 300 reads the signal $V_{R1}$ outputted by the measurement module 140. The Signal $V_{R1}$ is representative of the current of the signal source 120 and the resistor $R_1$ of the compensation module 130.

The signal $V_{R1}$ may be outputted for monitoring purposes. For example, the nominal value of $V_{R1}$ is determined by the resistor $R_1$ value, e.g 100 Ω and by the current value of the signal source 120, e.g. 20 mA, giving $V_{R1}$=2V. In case $V_{R1}$ increases by more than 5% compared to the nominal value, for example 100 mV, the signal source 120 has a drift and a possible malfunctioning is present on the signal source 120.

At step S5092, the processor 300 transfers a signal for opening the switch $S_1$, a signal for closing the switch $S_3$, a signal for opening the switch $S_4$ and a signal for opening the switch $S_5$.

At step S5093, the processor 300 transfers a signal for opening the switch $S_1$, a signal for opening the switch $S_3$, a signal for opening the switch $S_4$ and a signal for opening the switch $S_5$.

At step S5094, the processor 300, at an instant t1, reads the signal $V_{C2}$(t1) outputted by the measurement module 140. The instant t1 is for example triggered 1 μs after the opening of the switch $S_3$.

At step S5095, the processor 300, at an instant t2, reads the signal $V_{C2}$(t2) outputted by the measurement module 140. The instant t2 is for example triggered 2 μs after the opening of the switch $S_3$.

The signals $V_{C2}$(t1), $V_{C2}$(t2) may be outputted for monitoring purposes. For example, the nominal value of $V_{C2}$(t1) is memorized or calculated. For example, for a capacitor $C_2$ value of 10 nF, a current source 120 of 20 mA and t1=1 μs, $V_{C2}$(t1)=2V. In case $V_{C2}$(t1) increases or reduces by more than 10% compared to the nominal value, for example 1.8V or 2.2V, a malfunctioning is present on the switch $S_3$.

At step S5096, the processor 300 transfers a signal for closing the switch $S_1$, a signal for closing the switch $S_3$, a signal for opening the switch $S_4$ and a signal for opening the switch $S_5$.

At step S5097, the processor 300 transfers a signal for closing the switch $S_1$, a signal for opening the switch $S_3$, a signal for opening the switch $S_4$ and a signal for opening the switch $S_5$.

At step S5098, the processor 300, at an instant t1, reads the signal $V_{TSEP}$(t1) outputted by the measurement module 140. The instant t1 is for example triggered 1 μs after the opening of the switch $S_3$.

At step S5099, the processor 300, at an instant t2, reads the signal $V_{TSEP}$(t2) outputted by the measurement module 140. The instant t2 is for example triggered 2 μs after the opening of the switch $S_3$.

At step S5100, the processor 300 calculates the voltage of the temperature sensitive parameter as the following expression.

$$TSEP = \frac{1}{V_{R1}} \frac{V_{TSEP}(t1)V_{c2}(t2) - V_{TSEP}(t2)V_{c2}(t1)}{(V_{c2}(t2) - V_{c2}(t1))}$$

From the TSEP value, the processor 300 determines the temperature using a look up table determined during a calibration phase stored in the RAM memory 303.

FIG. 5i represents an example of an algorithm for determining the junction temperature of a power semiconductor from a temperature sensitive parameter according to the first embodiment and when the compensation module comprises only the switches $S_1$, $S_2$, $S_3$ and $S_5$ and the capacitors $C_1$ and $C_2$.

The present algorithm is disclosed in an example wherein it is executed by the processor 300.

At step S5110, the processor 300 transfers a signal for opening the switch $S_1$, a signal for closing the switch $S_2$, a signal for closing the switch $S_3$ and a signal for opening the switch $S_5$.

At step S5111, the processor 300 transfers a signal for opening the switch $S_1$, a signal for closing the switch $S_2$, a signal for opening the switch $S_3$ and a signal for opening the switch $S_5$.

At step S5112, the processor 300, at an instant t1, reads the signal $V_{C1}$(t1) outputted by the measurement module 140. The instant t1 is for example triggered 1 μs after the opening of the switch $S_3$.

At step S5113, the processor 300, at an instant t2, reads the signal $V_{C1}$(t2) outputted by the measurement module 140. The instant t2 is for example triggered 2 μs after the opening of the switch $S_3$.

The signal $V_{C1}$(t1), $V_{C1}$(t2) may be used for monitoring purposes. For example, the nominal value of $$\frac{t2 * V_{C1}(t1) - t1 * V_{C1}(t2)}{t2 - t1}$$

is memorized or calculated. For example, for a signal source 120 of 20 mA and the external electrical circuit 110 composed of a voltage source in series with a resistor of 5 Ω

$$\frac{t2 * V_{C1}(t1) - t1 * V_{C1}(t2)}{t2 - t1} = 100 \text{ mV}.$$

In case $$\frac{t2 * V_{C1}(t1) - t1 * V_{C1}(t2)}{t2 - t1}$$

increases by more than 100% compared to the nominal value, for example 200 mV, the external electrical circuit 110 has a drift and a possible malfunctioning is present on the circuit 110.

At step S5114, the processor 300 transfers a signal for opening the switch $S_1$, a signal for opening the switch $S_2$, a signal for closing the switch $S_3$ and a signal for closing the switch $S_5$.

At step S5115, the processor 300 transfers a signal for opening the switch $S_1$, a signal for opening the switch $S_2$, a signal for opening the switch $S_4$ and a signal for closing the switch $S_5$.

At step S5116, the processor 300, at an instant t1, reads the signal $V_{C2}$(t1) outputted by the measurement module 140. The instant t1 is for example triggered 1 µs after the opening of the switch $S_3$.

At step S5117, the processor 300, at an instant t2, reads the signal $V_{C2}$(t2) outputted by the measurement module 140. The instant t2 is for example triggered 1 µs after the opening of the switch $S_3$.

The signals $V_{C2}$(t1), $V_{C2}$(t2) may be outputted for monitoring purposes. For example, the nominal value of $V_{C2}$(t1) is memorized or calculated. For example, for a capacitor $C_2$ value of 10 nF, a current source 120 of 20 mA and t1=1 µs, $V_{C2}$(t1)=2V. In case $V_{C2}$(t1) increases or reduces by more than 10% compared to the nominal value, for example 1.8V or 2.2V, a malfunctioning is present on the switch $S_3$.

At step S5118, the processor 300 transfers a signal for closing the switch $S_1$, a signal for opening the switch $S_2$, a signal for closing the switch $S_3$ and a signal for opening the switch $S_5$.

At step S5119, the processor 300 transfers a signal for closing the switch $S_1$, a signal for opening the switch $S_2$, a signal for opening the switch $S_3$ and a signal for opening the switch $S_5$.

At step S5120, the processor 300, at an instant t1, reads the signal $V_{TSEP}$(t1) outputted by the measurement module 140. The instant t1 is for example triggered 1 µs after the opening of the switch $S_3$.

At step S5121, the processor 300, at an instant t2, reads the signal $V_{TSEP}$(t2) outputted by the measurement module 140. The instant t2 is for example triggered 1 µs after the opening of the switch $S_3$.

At step S5122, the processor 300 calculates the voltage of the temperature sensitive parameter as the following expression.

$$TSEP = \frac{V_{c2}(t2) \cdot V_{TSEP}(t1) - V_{c2}(t1) \cdot V_{TSEP}(t2)}{V_{c2}(t2) - V_{c2}(t1)} - \frac{V_{c2}(t2) \cdot V_{C1}(t1) - V_{c2}(t1) \cdot V_{C1}(t2)}{V_{c2}(t2) - V_{c2}(t1)}$$

From the TSEP value, the processor 300 determines the temperature using a look up table determined during a calibration phase stored in the RAM memory 303.

FIG. 5j represents an example of an algorithm for determining the junction temperature of a power semiconductor from a temperature sensitive parameter according to the first embodiment and when the compensation module comprises only the switches $S_1$, $S_3$, $S_4$ and $S_5$ and the capacitor $C_2$ and the resistor $R_1$.

The present algorithm is disclosed in an example wherein it is executed by the processor 300.

At step S5130, the processor 300 transfers a signal for closing the switch $S_1$, a signal for closing the switch $S_3$, a signal for opening the switch $S_4$ and a signal for opening the switch $S_5$.

At step S5131, the processor 300 reads the signal $V_o$ outputted by the measurement module 140. The signal $V_o$ is representative of an offset voltage generated by parasitic resistors of the compensation module 130 and by an internal offset of the measurement module 140.

For example, if $V_o$ is superior to 0.3 Volts, it means that the measurement module 140 has a drift and a possible malfunctioning exists on the compensation module 130 and/or on the measurement module 140.

At step S5133 the processor 300 transfers a signal for closing the switch $S_1$, a signal for opening the switch $S_3$, a signal for closing the switch $S_4$ and a signal for opening the switch $S_5$.

At step S5134, the processor 300 reads the signal $V_{R1}$ outputted by the measurement module 140. The Signal $V_{R1}$ is representative of the current of the signal source 120 and the resistor $R_1$ of the compensation module 130.

The signal $V_{R1}$ may be outputted for monitoring purposes. For example, the nominal value of $V_{R1}$ is determined by the resistor $R_1$ value, e.g 100 Ω and by the current value of the signal source 120, e.g. 20 mA, giving $V_{R1}$=2V. In case $V_{R1}$ increases by more than 5% compared to the nominal value, for example 100 mV, the signal source 120 has drift and a possible malfunctioning is present on the signal source 120.

At step S5135, the processor 300 transfers a signal for opening the switch $S_1$, a signal for closing the switch $S_3$, a signal for opening the switch $S_4$ and a signal for closing the switch $S_5$.

At step S5136, the processor 300 transfers a signal for opening the switch $S_1$, a signal for opening the switch $S_3$, a signal for opening the switch $S_4$ and a signal for closing the switch $S_5$.

At step S5137, the processor 300, at an instant t1, reads the signal $V_{C2}$(t1) outputted by the measurement module 140. The instant t1 is for example triggered 1 µs after the opening of the switch $S_3$.

At step S5138, the processor 300, at an instant t2, reads the signal $V_{C2}$(t2) outputted by the measurement module 140. The instant t2 is for example triggered 2 µs after the opening of the switch $S_3$.

The signals $V_{C2}$(t1), $V_{C2}$(t2) may be outputted for monitoring purposes. For example, the nominal value of $V_{C2}$(t1) is memorized or calculated. For example, for a capacitor $C_2$ value of 10 nF, a current source 120 of 20 mA and t1=$V_{C2}$(t1)=2V. In case $V_{C2}$(t1) increases or reduces by more than 10% compared to the nominal value, for example 1.8V or 2.2V, a malfunctioning is present on the switch $S_3$.

At step S5139, the processor 300 transfers a signal for closing the switch $S_1$, a signal for opening the switch $S_3$, a signal for opening the switch $S_4$ and a signal for opening the switch $S_5$.

At step S5140, the processor 300 transfers a signal for closing the switch $S_1$, a signal for opening the switch $S_3$, a signal for opening the switch $S_4$ and a signal for opening the switch $S_5$.

At step S5141, the processor 300, at an instant t1, reads the signal $V_{TSEP}$(t1) outputted by the measurement module 140. The instant t1 is for example triggered 1 µs after the opening of the switch $S_3$.

At step S5142, the processor 300, at an instant t2, reads the signal $V_{TSEP}$(t2) outputted by the measurement module 140. The instant t2 is for example triggered 2 µs after the opening of the switch $S_3$.

At step S5143, the processor 300 calculates the voltage of the temperature sensitive parameter as the following expression.

$$TSEP = \frac{(V_{C2}(t2) - V_o) \cdot (V_{TSEP}(t1) - V_o) - (V_{C2}(t1) - V_o) \cdot (V_{TSEP}(t2) - V_o)}{(V_{C2}(t2) - V_{C2}(t1)) \cdot V_{R1}}$$

From the TSEP value, the processor 300 determines the temperature using a look up table determined during a calibration phase stored in the RAM memory 303.

FIG. 5k represents an example of an algorithm for determining the junction temperature of a power semiconductor from a temperature sensitive parameter according to the first embodiment and when the compensation module comprises the switches $S_1$, $S_2$, $S_3$, $S_4$ and $S_5$ and the capacitors $C_1$, $C_2$ and the resistor $R_1$.

The present algorithm is disclosed in an example wherein it is executed by the processor 300.

At step S5150, the processor 300 transfers a signal for closing the switch $S_1$, a signal for opening the switch $S_2$, a signal for opening the switch $S_3$, a signal for closing the switch $S_4$ and a signal for opening the switch $S_5$.

At step S5151, the processor 300 reads the signal $V_{R1}$ outputted by the measurement module 140. The Signal $V_{R1}$ is representative of the current of the signal source 120 and the resistor $R_1$ of the compensation module 130.

The signal $V_{R1}$ may be outputted for monitoring purposes. For example, the nominal value of $V_{R1}$ is determined by the resistor $R_1$ value, e.g 100 Ω and by the current value of the signal source 120, e.g. 20 mA, giving $V_{R1}$=2V. In case $V_{R1}$ increases by more than 5% compared to the nominal value, for example 100 mV, the signal source 120 has drift and a possible malfunctioning is present on the signal source 120.

At step S5152, the processor 300 transfers a signal for opening the switch $S_1$, a signal for closing the switch $S_2$, a signal for closing the switch $S_3$, a signal for opening the switch $S_4$ and a signal for opening the switch $S_5$.

At step S5153 the processor 300 transfers a signal for opening the switch $S_1$, a signal for closing the switch $S_2$, a signal for opening the switch $S_3$, a signal for opening the switch $S_4$ and a signal for opening the switch $S_5$.

At step S5154, the processor 300, at an instant t1, reads the signal $V_{C1}(t1)$ outputted by the measurement module 140. The instant t1 is for example triggered 1 μs after the opening of the switch $S_3$.

At step S5155, the processor 300, at an instant t2, reads the signal $V_{C1}(t2)$ outputted by the measurement module 140. The instant t2 is for example triggered 2 μs after the opening of the switch $S_3$.

The signal $V_{C1}(t1)$, $V_{C1}(t2)$ may be used for monitoring purposes. For example, the nominal value of $$\frac{t2 * V_{C1}(t1) - t1 * V_{C1}(t2)}{t2 - t1}$$

is memorized or calculated. For example, for a signal source 120 of 20 mA and the external electrical circuit 110 composed of a voltage source in series with a resistor of 5 Ω

$$\frac{t2 * V_{C1}(t1) - t1 * V_{C1}(t2)}{t2 - t1} = 100 \text{ mV}.$$

In case $$\frac{t2 * V_{C1}(t1) - t1 * V_{C1}(t2)}{t2 - t1}$$

increases by more than 100% compared to the nominal value, for example 200 mV, the external electrical circuit 110 has a drift and a possible malfunctioning is present on the circuit 110.

At step S5156 the processor 300 transfers a signal for opening the switch $S_1$, a signal for opening the switch $S_2$, a signal for closing the switch $S_3$, a signal for opening the switch $S_4$ and a signal for closing the switch $S_5$.

At step S5157 the processor 300 transfers a signal for opening the switch $S_1$, a signal for opening the switch $S_2$, a signal for opening the switch $S_3$, a signal for opening, the switch $S_4$ and a signal for closing the switch $S_5$.

At step S5158, the processor 300, at an instant t1, reads the signal $V_{C2}(t1)$ outputted by the measurement module 140. The instant t1 is for example triggered 1 μs after the opening of the switch $S_3$.

At step S5159, the processor 300, at an instant t2, reads the signal $V_{C2}(t2)$ outputted by the measurement module 140. The instant t2 is for example triggered 2 μs after the opening of the switch $S_3$.

The signals $V_{C2}(t1)$, $V_{C2}(t2)$ may be outputted for monitoring purposes. For example, the nominal value of $V_{C2}(t1)$ is memorized or calculated. For example, for a capacitor $C_2$ value of 10 nF, a current source 120 of 20 mA and t1=1 μs, $V_{C2}(t1)$=2V. In case $V_{C2}(t1)$ increases or reduces by more than 10% compared to the nominal value, for example 1.8V or 2.2V, a malfunctioning is present on the switch $S_3$.

At step S5160, the processor 300 transfers a signal for closing the switch $S_1$, a signal for opening the switch $S_2$, a signal for closing the switch $S_3$, a signal for opening the switch $S_4$ and a signal for opening the switch $S_5$.

At step S5161, the processor 300 transfers a signal for closing the switch $S_1$, a signal for opening the switch $S_2$, a signal for opening the switch $S_3$, a signal for opening the switch $S_4$ and a signal for opening the switch $S_5$.

At step S5162, the processor 300, at an instant t1, reads the signal $V_{TSEP}(t1)$ outputted by the measurement module 140. The instant t1 is for example triggered 1 μs after the opening of the switch $S_3$.

At step S5163, the processor 300, at an instant t2, reads the signal $V_{TSEP}(t2)$ outputted by the measurement module 140. The instant t2 is for example triggered 2 μs after the opening of the switch $S_3$.

At step S5164, the processor 300 calculates the voltage of the temperature sensitive parameter as the following expression.

$$TSEP = \frac{1}{V_{R1}} \cdot \frac{V_{TSEP}(t1)V_{C2}(t2) - V_{TSEP}(t2)V_{C2}(t1)}{V_{C2}(t2) - V_{C2}(t1)} - \frac{1}{V_{R1}} \frac{V_{C1}(t1)V_{C2}(t2) - V_{C1}(t2)V_{C2}(t1)}{V_{C2}(t2) - V_{C2}(t1)}$$

From the TSEP value, the processor 300 determines the temperature using a look up table determined during a calibration phase stored in the RAM memory 303.

FIG. 5l represents an example of an algorithm for determining the junction temperature of a power semiconductor from a temperature sensitive parameter according to the first embodiment and when the compensation module comprises the switches $S_1$, $S_2$, $S_3$, $S_4$ and $S_5$ and the capacitors $C_1$, $C_2$ and the resistor $R_1$.

The present algorithm is disclosed in an example wherein it is executed by the processor 300.

At step S5170, the processor 300 transfers a signal for closing the switch $S_1$, a signal for opening the switch $S_2$, a signal for closing the switch $S_3$, a signal for opening the switch $S_4$ and a signal for opening the switch $S_5$.

In a variation of the step S5170, the processor 300 transfers a signal for opening the switch $S_1$, a signal for opening the switch $S_2$, a signal for closing the switch $S_3$, a signal for opening the switch $S_4$ and a signal for opening the switch $S_5$.

At step S5171, the processor 300 reads the signal $V_o$ outputted by the measurement module 140. The signal $V_o$ is representative of an offset voltage generated by parasitic resistors of the compensation module 130 and by an internal offset of the measurement module 140.

For example, if $V_o$ is superior to 0.3 Volts, it means that the measurement module 140 has a drift and that a possible malfunctioning exists on the compensation module 130 and/or on the measurement module 140.

At step S5172, the processor 300 transfers a signal for closing the switch $S_1$, a signal for opening the switch $S_2$, a signal for opening the switch $S_3$, a signal for closing the switch $S_4$ and a signal for opening the switch $S_5$.

Then, the signal source 120 provides a current with an amplitude I1 that flows through the resistor $R_1$.

In a variation of the step S5172, the processor 300 transfers a signal for opening the switch $S_1$, a signal for opening the switch $S_2$, a signal for opening the switch $S_3$, a signal for closing the switch $S_4$ and a signal for opening the switch $S_5$.

Then, the signal source 120 provides a current with an amplitude I1 that flows through the resistor $R_1$ and through the thermal sensitive electrical device 100 during the transient and flows only through the resistor $R_1$ in the steady state.

At step S5173, the processor 300 reads the signal $V_{R1}$ outputted by the measurement module 140 after a certain time, for example 1 μs. The Signal $V_{R1}$ is representative of the current of the signal source 120 and the resistor $R_1$ of the compensation module 130.

The signal $V_{R1}$ may be outputted for monitoring purposes. For example, the nominal value of $V_{R1}$ is determined by the resistor $R_1$ value, e.g 100 Ω and by the current value of the signal source 120, e.g. 20 mA, giving $V_{R1}$=2V. In case $V_{R1}$ increases by more than 5% compared to the nominal value, for example 100 mV, the signal source 120 has a drift and a possible malfunctioning is present on the signal source 120.

At step S5174, the processor 300 transfers a signal for opening the switch $S_1$, a signal for closing the switch $S_2$, a signal for closing the switch $S_3$, a signal for opening the switch $S_4$ and a signal for opening the switch $S_5$.

At step S5175 the processor 300 transfers a signal for opening the switch $S_1$, a signal for closing the switch $S_2$, a signal for opening the switch $S_3$, a signal for opening the switch $S_4$ and a signal for opening the switch $S_5$.

Then, the signal source 120 provides a current with an amplitude I1 that flows through the capacitor C1.

At step S5176, the processor 300, at an instant t1, reads the signal $V_{C1}(t1)$ outputted by the measurement module 140. The instant t1 is for example triggered 1 μs after the opening of the switch $S_3$.

At step S5177, the processor 300, at an instant t2, reads the signal $V_{C1}(t2)$ outputted by the measurement module 140. The instant t2 is for example triggered 2 μs after the opening of the switch $S_3$.

The signal $V_{C1}(t1)$, $V_{C1}(t2)$ may be used for monitoring purposes. For example, the nominal value of $$\frac{t2 * V_{C1}(t1) - t1 * V_{C1}(t2)}{t2 - t1}$$

is memorized or calculated. For example, for a signal source 120 of 20 mA and the external electrical circuit 110 composed of a voltage source in series with a resistor of 5 Ω

$$\frac{t2 * V_{C1}(t1) - t1 * V_{C1}(t2)}{t2 - t1} = 100 \text{ mV}.$$

In case $$\frac{t2 * V_{C1}(t1) - t1 * V_{C1}(t2)}{t2 - t1}$$

increases by more than 100% compared to the nominal value, for example 200 mV, the external electrical circuit 110 has drift and a possible malfunctioning is present on the external electrical circuit 110.

At step S5178 the processor 300 transfers a signal for opening the switch $S_1$, a signal for opening the switch $S_2$, a signal for closing the switch $S_3$, a signal for opening the switch $S_4$ and a signal for closing the switch $S_5$.

At step S5179 the processor 300 transfers a signal for opening the switch $S_1$, a signal for opening the switch $S_2$, a signal for opening the switch $S_3$, a signal for opening the switch $S_4$ and a signal for closing the switch $S_5$.

Then, the signal source 120 provides a current with an amplitude I1 that flows through the capacitor $C_2$.

At step S5180, the processor 300, at an instant t1, reads the signal $V_{C2}(t1)$ outputted by the measurement module 140. The instant t1 is for example triggered 1 μs after the opening of the switch $S_3$.

At step S5181, the processor 300, at an instant t2, reads the signal $V_{C2}(t2)$ outputted by the measurement module 140. The instant t2 is for example triggered 2 μs after the opening of the switch $S_3$.

The signals $V_{C2}(t1)$, $V_{C2}(t2)$ may be outputted for monitoring purposes. For example, the nominal value of $V_{C2}(t1)$ is memorized or calculated. For example, for a capacitor $C_2$ value of 10 nF, a current source 120 of 20 mA and t1=1 μs, $V_{C2}(t1)$=2V. In case $V_{C2}(t1)$ increases or reduces by more than 10% compared to the nominal value, for example 1.8V or 2.2V, a malfunctioning is present on the switch $S_3$.

At step S5182, the processor 300 transfers a signal for closing the switch $S_1$, a signal for opening the switch $S_2$, a signal for closing the switch $S_3$, a signal for opening the switch $S_4$ and a signal for opening the switch $S_5$.

At step S5183, the processor 300 transfers a signal for closing the switch $S_1$, a signal for opening the switch $S_2$, a signal for opening the switch $S_3$, a signal for opening the switch $S_4$ and a signal for opening the switch $S_5$.

Then, the signal source 120 provides a current with an amplitude I1 that flows through the thermal sensitive electrical device 100.

At step S5184, the processor 300, at an instant t1, reads the signal $V_{TSEP}(t1)$ outputted by the measurement module 140. The instant t1 is for example triggered 1 μs after the opening of the switch $S_3$.

At step S5185, the processor 300, at an instant t2, reads the signal $V_{TSEP}(t2)$ outputted by the measurement module 140. The instant t2 is for example triggered 2 μs after the opening of the switch $S_3$.

At step S5186, the processor 300 calculates the voltage of the temperature sensitive parameter as the following expression.

$$TSEP = \frac{1}{V_{R1} - V_o} * \frac{\begin{array}{c}V_o(V_{TSEP}(t1) - V_{TSEP}(t2) + \\ V_{C2}(t1) - V_{C2}(t2)) - \\ V_{TSEP}(t1)V_{C2}(t2) + \\ V_{TSEP}(t2)V_{C2}(t1)\end{array}}{V_{C2}(t1) - V_{C2}(t2)} +$$

-continued $$\frac{1}{V_{R1} - V_o} * \frac{\begin{array}{c}V_o(V_{C1}(t1) - V_{C1}(t2) + \\ V_{C2}(t2) - V_{C2}(t1)) + \\ V_{C1}(t1)V_{C2}(t1) - V_{C1}(t2)V_{C2}(t1)\end{array}}{V_{C2}(t1) - V_{C2}(t2)}$$

From the TSEP value, the processor 300 determines the temperature using a look up table determined during a calibration phase stored in the RAM memory 303.

FIG. 5m represents an example of an algorithm for determining the junction temperature of a power semiconductor from a temperature sensitive parameter according to the second and third embodiments and when the compensation module comprises only the switches $S_1$ and $S_3$.

The present algorithm is disclosed in an example wherein it is executed by the processor 300.

At step S5190, the processor 300 transfers a signal for opening the switch $S_1$ and a signal for closing the switch $S_3$.

At step S5191, the processor 300 reads the signal $V_o$ outputted by the measurement module 140. The Signal $V_o$ is representative of an offset voltage generated by parasitic resistors of the compensation module 130 and by an internal offset of the measurement module 140.

For example, if $V_o$ is superior to 0.3 Volts, it means that the measurement module 140 has a drift and that a possible malfunctioning exists on the compensation module 130 and/or on the measurement module 140.

At step S5192, the processor 300 transfers a signal for closing the switch $S_1$ and a signal for opening the switch $S_3$.

At step S5193, the processor 300, at an instant t1, reads the signal $V_{TSEP}(t1)$ outputted by the measurement module 140. The instant t1 is for example triggered 1 μs after the opening of the switch $S_3$.

At step S5194, the processor 300 calculates the voltage of the temperature sensitive parameter as the following expression.

$$TSEP = V_{TSEP}(t1) - V_o$$

From the TSEP value, the processor 300 determines the temperature using a look up table determined during a calibration phase stored in the RAM memory 303.

FIG. 5n represents an example of an algorithm for determining the junction temperature of a power semiconductor from a temperature sensitive parameter according to the second and third embodiments and when the compensation module comprises only the switches $S_1$, $S_3$ and $S_4$ and the resistor $R_1$.

The present algorithm is disclosed in an example wherein it is executed by the processor 300.

At step S5200, the processor 300 transfers a signal for opening the switch $S_1$, a signal for closing the switch $S_3$ and a signal for opening the switch $S_4$.

At step S5201, the processor 300 reads the signal $V_o$ outputted by the measurement module 140. The Signal $V_o$ is representative of an offset voltage generated by parasitic resistors of the compensation module 130 and by an internal offset of the measurement module 140.

For example, if $V_o$ is superior to 0.3 Volts, it means that the measurement module 140 has a drift and that a possible malfunctioning exists on the compensation module 130 and/or on the measurement module 140.

At step S5202, the processor 300 transfers a signal for opening the switch $S_1$, a signal for opening the switch $S_3$ and a signal for closing the switch $S_4$.

Then, the signal source 120 provides a current with an amplitude I1 that flows through the resistor $R_1$. In the steady state, the current I1 flows entirely through $R_1$.

At step S5203, the processor 300 reads the signal $V_{R1}$ outputted by the measurement module 140. The Signal $V_{R1}$ is representative of the current of the signal source 120 and the resistor $R_1$ of the compensation module 130.

The signal $V_{R1}$ may be outputted for monitoring purposes. For example, the nominal value of $V_{R1}$ is determined by the resistor $R_1$ value, e.g 100 Ω and by the current value of the signal source 120, e.g. 20 mA, giving $V_{R1}$=2V. In case $V_{R1}$ increases by more than 5% compared to the nominal value, for example 100 mV, the signal source 120 has a drift and a possible malfunctioning is present on the signal source 120.

At step S5204, the processor 300 transfers a signal for closing the switch $S_1$, a signal for opening the switch $S_3$ and a signal for opening the switch $S_4$.

At step S5205, the processor 300, at an instant t1, reads the signal $V_{TSEP}(t1)$ outputted by the measurement module 140. The instant t1 is for example triggered 1 μs after the closing of the switch $S_1$.

At step S5206, the processor 300 calculates the voltage of the temperature sensitive parameter as the following expression.

$$TSEP = \frac{V_{TSEP}(t1) - V_o}{V_{R1} - V_o}$$

From the TSEP value, the processor 300 determines the temperature using a look up table determined during a calibration phase stored in the RAM memory 303.

FIG. 5o represents an example of an algorithm for determining the junction temperature of a power semiconductor from a temperature sensitive parameter according to the second embodiment and when the compensation module comprises only the switches $S_1$, $S_3$ and $S_4$ and the resistor $R_1$.

The present algorithm is disclosed in an example wherein it is executed by the processor 300.

At step S5210, the processor 300 transfers a signal for opening the switch $S_1$, a signal for closing the switch $S_3$ and a signal for opening the switch $S_4$.

At step S5211, the processor 300 reads the signal $V_o$ outputted by the measurement module 140. The Signal $V_o$ is representative of an offset voltage generated by parasitic resistors of the compensation module 130 and by an internal offset of the measurement module 140.

For example, if $V_o$ is superior to 0.3 Volts, it means that the measurement module 140 has a drift and that a possible malfunctioning exists on the compensation module 130 and/or on the measurement module 140.

At step S5212, the processor 300 transfers a signal for opening the switch $S_1$, a signal for opening the switch $S_3$ and a signal for closing the switch $S_4$.

At step S5213, the processor 300 reads the signal $V_{R1}(I1)$ outputted by the measurement module 140 when the signal source 120 provides a first current I1. The signal $V_{R1}$ (I1) is representative of voltage on the resistor $R_1$ of the compensation module 130.

At step S5214, the processor 300 reads the signal $V_{R1}(I2)$ outputted by the measurement module 140 when the signal source provides a second current I2. The signal $V_{R1}(I2)$ is representative of voltage on the resistor R1 of the compensation module 130.

The signal $V_{R1}$ may be outputted for monitoring purposes. For example, the nominal value of $V_{R1}$ is determined by the resistor $R_1$ value, e.g 100 Ω and by the current I1 or I2 value of the signal source 120. In case $V_{R1}$ increases by more than 5% compared to the nominal value, the signal source 120 has a drift and a possible malfunctioning is present on the signal source 120.

At step S5215, the processor 300 transfers a signal for closing the switch $S_1$, a signal for closing the switch $S_3$ and a signal for opening the switch $S_4$.

At step S5216, the processor 300 reads the signal $V_{TSEP}$ (I1) outputted by the measurement module 140 when the signal source provides the first current I1.

At step S5217, the processor 300 reads the signal $V_{TSEP}$ (I2) outputted by the measurement module 140 when the signal source provides the second current I2.

At step S5218, the processor 300 calculates the voltage of the temperature sensitive parameter as the following expression.

$$TSEP = (V_{TSEP}(I1) - V_o) - \frac{V_{TSEP}(I1) - V_{TSEP}(I2)}{V_{R1}(I2) - V_{R1}(I1)} * (V_{R1}(I1) - V_o)$$

From the TSEP value, the processor 300 determines the temperature using a look up table determined during a calibration phase stored in the RAM memory 303.

FIG. 5p represents an example of an algorithm for determining the junction temperature of a power semiconductor from a temperature sensitive parameter according to the second and third embodiments and when the compensation module comprises only the switches $S_1$, $S_3$ and $S_4$ and the resistor $R_1$.

The present algorithm is disclosed in an example wherein it is executed by the processor 300.

At step S5220, the processor 300 transfers a signal for opening the switch $S_1$, a signal for closing the switch $S_3$ and a signal for opening the switch $S_4$.

At step S5221, the processor 300 reads the signal $V_o$ outputted by the measurement module 140. The Signal $V_o$ is representative of an offset voltage generated by parasitic resistors of the compensation module 130 and by an internal offset of the measurement module 140.

For example, if $V_o$ is superior to 0.3 Volts, it means that the measurement module 140 has a drift and that a possible malfunctioning exists on the compensation module 130 and/or on the measurement module 140.

At step S5223, the processor 300 transfers a signal for opening the switch $S_1$, a signal for opening the switch $S_3$ and a signal for closing the switch $S_4$.

At step S5224, the processor 300 reads the signal $V_{R1}$ outputted by the measurement module 140. The Signal $V_{R1}$ is representative of the current of the signal source 120 and the resistor R1 of the compensation module 130.

The signal $V_{R1}$ may be outputted for monitoring purposes. For example, the nominal value of $V_{R1}$ is determined by the resistor $R_1$ value, e.g 100 Ω and by the current value of the signal source 120, e.g. 20 mA, giving $V_{R1}$=2V. In case $V_{R1}$ increases by more than 5% compared to the nominal value, for example 100 mV, the signal source 120 has a drift and a possible malfunctioning is present on the signal source 120.

At step S5225, the processor 300 transfers a signal for closing the switch $S_1$, a signal for closing the switch $S_3$ and a signal for opening the switch $S_4$.

At step S5226, the processor 300 transfers a signal for closing the switch $S_1$, a signal for opening the switch $S_3$ and a signal for opening the switch $S_4$.

At step S5227, the processor 300, at an instant t1, reads the signal $V_{TSEP}$(t1) outputted by the measurement module 140. The instant t1 is for example triggered 1 μs after the opening of the switch $S_3$.

At step S5228, the processor 300 calculates the voltage of the temperature sensitive parameter as the following expression.

$$TSEP = (V_{TSEP} - V_0)/(V_{R1} - V_0)$$

From the TSEP value, the processor 300 determines the temperature using a look up table determined during a calibration phase stored in the RAM memory 303.

FIG. 5q represents an example of an algorithm for determining the junction temperature of a power semiconductor from a temperature sensitive parameter according to the second embodiment and when the compensation module comprises only the switches $S_1$, $S_3$ and $S_4$ and the resistor $R_1$.

The present algorithm is disclosed in an example wherein it is executed by the processor 300.

At step S5230, the processor 300 transfers a signal for opening the switch $S_1$, a signal for closing the switch $S_3$ and a signal for opening the switch $S_4$.

At step S5231, the processor 300 reads the signal $V_o$ outputted by the measurement module 140. The Signal $V_o$ is representative of an offset voltage generated by parasitic resistors of the compensation module 130 and by an internal offset of the measurement module 140.

For example, if $V_o$ is superior to 0.3 Volts, it means that the measurement module 140 has a drift and that a possible malfunctioning exists on the compensation module 130 and/or on the measurement module 140.

At step S5233, the processor 300 transfers a signal for opening the switch $S_1$, a signal for opening the switch $S_3$ and a signal for closing the switch $S_4$.

At step S5234, the processor 300 reads the signal $V_{R1}$ (I1) outputted by the measurement module 140 when the signal source provides a first current I1. The signal $V_{R1}$(I1) is representative of voltage on the resistor $R_1$ of the compensation module 130.

At step S5235, the processor 300 reads the signal $V_{R1}$(I2) outputted by the measurement module 140 when the signal source provides a second current I2. The signal $V_{R1}$(I2) is representative of voltage on the resistor $R_1$ of the compensation module 130.

The signal $V_{R1}$ may be outputted for monitoring purposes. For example, the nominal value of $V_{R1}$ is determined by the resistor $R_1$ value and by the current value I1, I2 of the signal source 120. In case $V_{R1}$ increases by more than 5% compared to the nominal value, the signal source 120 has a drift and a possible malfunctioning is present on the signal source 120.

At step S5236, the processor 300 transfers a signal for closing the switch $S_1$, a signal for closing the switch $S_3$ and a signal for opening the switch $S_4$.

At step S5237, the processor 300 transfers a signal for closing the switch $S_1$, a signal for opening the switch $S_3$ and a signal for opening the switch $S_4$.

At step S5238, the processor 300 reads the signal $V_{TSEP}$ (I1) outputted by the measurement module 140 when the signal source provides the first current I1.

At step S5239, the processor 300 reads the signal $V_{TSEP}$ (I2) outputted by the measurement module 140 when the signal source provides the second current I2.

At step S5240, the processor 300 calculates the voltage of the temperature sensitive parameter as the following expression.

$$TSEP = V_{TSEP}(T1) - V_o - \frac{(V_{TSEP}(I1) - V_o) - (V_{TSEP}(I2) - V_o)}{(V_{R1}(I2) - V_o) - (V_{R1}(I1) - V_o)} * (V_{R1}(I1) - V_o)$$

From the TSEP value, the processor 300 determines the temperature using a look up table determined during a calibration phase stored in the RAM memory 303.

Figure 6:
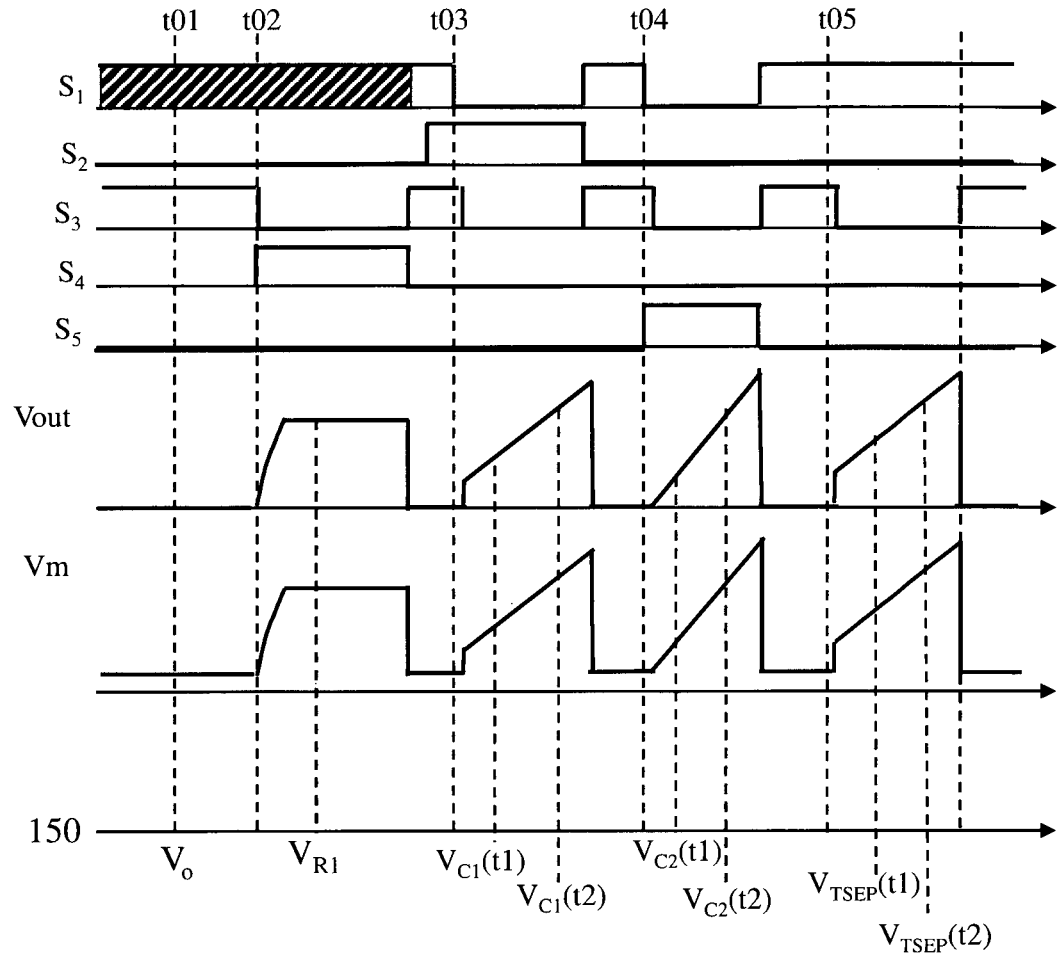
FIG. 6 represents chronograms of signal used for determining the junction temperature of a power semiconductor according to the first embodiment and wherein all the components shown in FIG. 2 are utilized.

FIG. 6 represents chronograms of signal used for determining the junction temperature of a power semiconductor according to the first embodiment and wherein all the components shown in FIG. 2 are utilized and that corresponds to the algorithm as disclosed in FIG. 5*l*.

Naturally, many modifications can be made to the embodiments of the invention described above without departing from the scope of the present invention.

The invention claimed is:

1. A method for determining a junction temperature of a power semiconductor using a temperature sensitive electrical parameter of a thermal sensitive electrical device in a system comprising the thermal sensitive electrical device, an external electrical circuit, a compensation module and a measurement module, characterized in that the compensation module is composed at least of a first and a second switches, a first terminal of the first switch is connected to a first terminal of the thermal sensitive electrical device, a second terminal of the first switch is connected to a first terminal of the second switch, to a first terminal of a signal source and to a first output of the compensation module, a second terminal of the second switch is connected to a second terminal of the signal source and to a second output of the compensation module, wherein the method comprises:

putting the first switch in a closing state and putting the second switch in an opening state during a first period of time in order to measure a first set of voltages, changing the state of the first switch and/or the state of the second switch or the state of at least one another switch during at least one another period of time in order to measure at least one another voltage, and determining a value of the temperature sensitive parameter using the measured voltages, and wherein:

the state of the second switch is changed during the at least one another period of time named second period of time in order to measure the at least one another voltage, and the at least one another voltage is a voltage that is representative of an offset voltage generated by parasitic resistors of the compensation module and by an internal offset of the measurement module or;

the state of the first and the second switches are changed during the at least one another period of time named third period of time, and the at least another switch is a third switch the state of which is set to closing state, the at least another voltage is a second set of voltages that are representative of the signal source and the external electrical circuit and a first terminal of the third switch is connected to the second terminal of the first switch, a second terminal of the third switch is connected to a first terminal of a first capacitor and a second terminal of the first capacitor is connected to a second terminal of the thermal sensitive electrical device and to a second terminal of the external electrical circuit or;

the state of the first switch is changed during the at least one another period of time named fourth period of time, and the at least another switch is a fourth switch the state of which is set to closing state, the at least another voltage is a set of voltages that are representative of the functioning of the second switch and a first terminal of the fourth switch is connected to the second terminal of the second switch, a second terminal of the fourth switch is connected to a first terminal of a second capacitor and a second terminal of the second capacitor is connected to the first terminal of the second switch or;

the at least another switch is a fifth switch the state of which is set to closing state during the at least one another period of time named fifth period of time, the at least another voltage is a voltage that is representative of the signal source and a first terminal of the fifth switch is connected to the second terminal of the second switch, a second terminal of the fifth switch is connected to a first terminal of a resistor and a second terminal of the resistor is connected to the first terminal of the second switch.

2. The method according to claim 1, characterized in that the thermal sensitive electrical parameter is an internal gate resistance in series with an input capacitance of a power semiconductor device.

3. The method according to claim 2, characterized in that the external circuit is a voltage source in series with a resistor or a short circuit or a resistor or a capacitor or an inductor or a switch.

4. The method according to claim 1, characterized in that the signal source is a current source.

5. The method according to claim 1, characterized in that the thermal sensitive electrical device is a PN junction implanted on a power semiconductor device or implanted close to the power semiconductor device.

6. The method according to claim 1, characterized in that the thermal sensitive electrical device is a resistance dependent on the temperature implanted on the power semiconductor device or implanted close to a power semiconductor.

7. The method according to claim 1, characterized in that the at least one other voltage is compared to a reference voltage and a notification is generated if the at least one other voltage is out of the range of the reference voltage.

8. A system for determining a junction temperature of a power semiconductor using a temperature sensitive electrical parameter of a thermal sensitive electrical device, the system comprising the thermal sensitive electrical device, an external electrical circuit, a compensation module and a measurement module, characterized in that the compensation module is composed at least of a first and a second switches, a first terminal of the first switch is connected to a first terminal of the thermal sensitive electrical device, a second terminal of the first switch is connected to a first terminal of the second switch, to a first terminal of a signal source and to a first output of the compensation module, a second terminal of the second switch is connected to a second terminal of the signal source and to a second output of the compensation module, wherein the system comprises circuitry configured to:

put the first switch in a closing state and putting the second switch in an opening state during a first period of time in order to measure a first set of voltages, change the state of the first switch and/or the state of the second switch or the state of at least one another switch during at least one another period of time in order to measure at least one another voltage, and determine a value of the temperature sensitive parameter using the measured voltages and wherein:

the state of the second switch is changed during the at least one another period of time named second period of time in order to measure the at least one another voltage, and the at least one another voltage is a voltage that is representative of an offset voltage generated by parasitic resistors of the compensation module and by an internal offset of the measurement module or;

the state of the first and the second switches are changed during the at least one another period of time named third period of time, and the at least another switch is a third switch the state of which is set to closing state, the at least another voltage is a second set of voltages that are representative of the signal source and the external electrical circuit and a first terminal of the third switch is connected to the second terminal of the first switch, a second terminal of the third switch is connected to a first terminal of a first capacitor and a second terminal of the first capacitor is connected to a second terminal of the thermal sensitive electrical device and to a second terminal of the external electrical circuit or;

the state of the first switch is changed during the at least one another period of time named fourth period of time, and the at least another switch is a fourth switch the state of which is set to closing state, the at least another voltage is a set of voltages that are representative of the functioning of the second switch and a first terminal of the fourth switch is connected to the second terminal of the second switch, a second terminal of the fourth switch is connected to a first terminal of a second capacitor and a second terminal of the second capacitor is connected to the first terminal of the second switch or;

the at least another switch is a fifth switch the state of which is set to closing state during the at least one another period of time named fifth period of time, the at least another voltage is a voltage that is representative of the signal source and a first terminal of the fifth switch is connected to the second terminal of the second switch, a second terminal of the fifth switch is connected to a first terminal of a resistor and a second terminal of the resistor is connected to the first terminal of the second switch.

* * * * *